US012724820B2

(12) United States Patent
Kim et al.

(10) Patent No.: US 12,724,820 B2
(45) Date of Patent: Sep. 1, 2026

(54) TEXT-BASED IMAGE RETRIEVAL

(71) Applicant: ADOBE INC., San Jose, CA (US)

(72) Inventors: Hyunjae Kim, Seoul (KR); Seunghyun Yoon, San Jose, CA (US); Trung Huu Bui, San Jose, CA (US); Handong Zhao, Cupertino, CA (US); Quan Tran, San Jose, CA (US); Franck Dernoncourt, Spokane, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/791,745

(22) Filed: Aug. 1, 2024

(65) Prior Publication Data

US 2026/0037572 A1 Feb. 5, 2026

(51) Int. Cl.
*G06F 7/00* (2006.01)
*G06F 16/535* (2019.01)
*G06F 40/40* (2020.01)
*G06T 11/60* (2006.01)

(52) U.S. Cl.
CPC ............ *G06F 16/535* (2019.01); *G06F 40/40* (2020.01); *G06T 11/60* (2013.01)

(58) Field of Classification Search
CPC ......... G06F 16/535; G06F 40/40; G06T 11/60
See application file for complete search history.

(56) References Cited

U.S. PATENT DOCUMENTS 9,691,095 B2 * 6/2017 McCluskey ............ G06Q 30/08
10,467,703 B2 * 11/2019 Olson .................... G06Q 40/08
10,699,323 B1 * 6/2020 Tang ..................... G06T 19/006
2002/0107747 A1 * 8/2002 Gerogianni ............ G06Q 30/06 705/26.8
2004/0267610 A1 * 12/2004 Gossett .............. G06Q 30/0214 705/14.16
2010/0274775 A1 * 10/2010 Fontes ................ G06F 16/9038 707/706
2012/0173692 A1 * 7/2012 Lakes ................. G06F 16/9566 709/223
2013/0238612 A1 * 9/2013 Tsongas .............. G06F 16/9535 707/723
2014/0143095 A1 * 5/2014 McCluskey ........ G06Q 30/0627 705/26.63
2014/0279275 A1 * 9/2014 Burgiss .............. G06Q 30/0635 705/26.81

(Continued)

OTHER PUBLICATIONS

Image Captioning using Deep Learning: Text Augmentation by Paraphrasing via Backtranslation; Ingrid Ravn Turkerud, Ole Jakob Mengshoel, Department of Computer Science NTNU, Trondheim, Norway, (Year: 2011).*

(Continued)

*Primary Examiner* — Mohammed R Uddin
(74) *Attorney, Agent, or Firm* — F. CHAU & ASSOCIATES, LLC

(57) ABSTRACT

A method, apparatus, non-transitory computer readable medium, and system for media processing include obtaining a text prompt describing content, generating, using a multi-modal encoder, a text embedding based on the text prompt, and obtaining an image depicting the content based on the text embedding. The multi-modal encoder is trained to encode image descriptions based on a similarity between a caption of a training image and a paraphrase of the caption.

18 Claims, 14 Drawing Sheets

(56) References Cited

U.S. PATENT DOCUMENTS

| | | | | |
|---|---|---|---|---|
| 2016/0307174 | A1* | 10/2016 | Marcelle | G06Q 30/0621 |
| 2017/0255983 | A1* | 9/2017 | McCluskey | G06Q 30/06 |
| 2018/0219849 | A1* | 8/2018 | Jones | G06F 16/904 |
| 2018/0349988 | A1* | 12/2018 | Shebesta | G06Q 40/02 |
| 2021/0120297 | A1* | 4/2021 | Deshpande | G06Q 10/08 |
| 2022/0121702 | A1* | 4/2022 | Kale | G06N 3/04 |
| 2022/0309546 | A1* | 9/2022 | Zheng | G06Q 30/0278 |
| 2024/0168992 | A1* | 5/2024 | Shu | G06V 10/82 |
| 2024/0290065 | A1* | 8/2024 | Park | G06V 10/44 |
| 2024/0370718 | A1* | 11/2024 | Panagopoulou | G06N 3/045 |
| 2024/0378369 | A1* | 11/2024 | Chugh | G06F 40/56 |
| 2024/0386049 | A1* | 11/2024 | Agrawal | G06F 40/20 |
| 2025/0173911 | A1* | 5/2025 | Amadori | G06T 3/4046 |

OTHER PUBLICATIONS

Generating Diverse and Descriptive Image Captions Using Visual Paraphrases; Lixin Liu, Jiajun Tang, Xiaojun Wan, Zongming Guo; Institute of Computer Science and Technology, Peking University Center for Data Science, Peking University, (Year: 2019).*

Agirre, et al., "SemEval-2015 Task 2: Semantic Textual Similarity, English, Spanish, and Pilot on Interpretability", In Proceedings of the 9th International Workshop on Semantic Evaluation (SemEval 2015), pp. 252-263, Jun. 4, 2015, 12 pages.

Agirre, et al., "SemEval-2014 Task 10: Multilingual Semantic Textual Similarity", In Proceedings of the 8th International Workshop on Semantic Evaluation (SemEval 2014), pp. 81-91, Aug. 23, 2014, 11 pages.

Agirre, et al., "SemEval-2016 Task 1: Semantic Textual Similarity, Monolingual and Cross-lingual Evaluation", In Proceedings of the 10th International Workshop on Semantic Evaluation (SemEval-2016), pp. 497-511, Jun. 16, 2016, 15 pages.

Agirre, et al., "SemEval-2012 Task 6: A Pilot on Semantic Textual Similarity", In Proceedings of the First Joint Conference on Lexical and Computational Semantics (*SEM), pp. 385-393, Jun. 7, 2012, 9 pages.

Agirre, et al., "*SEM 2013 shared task: Semantic textual similarity", In Second Joint Conference on Lexical and Computational Semantics (*SEM), vol. 1: Proceedings of the Main Conference and the Shared Task: Semantic Textual Similarity, pp. 32-43, Jun. 13, 2013, 12 pages.

Brown, et al., "Language Models are Few-Shot learners", 34th Conference on Neural Information Processing Systems (NeurIPS 2020), arXiv preprint arXiv:2005.14165v4 [cs.CL] Jul. 22, 2020, 25 pages.

Cer, et al., "SemEval-2017 Task 1: Semantic Textual Similarity Multilingual and Cross-lingual Focused Evaluation", In Proceedings of the 11th International Workshop on Semantic Evaluation (SemEval-2017), pp. 1-14, Aug. 3-4, 2017, 14 pages.

Cherti, et al., "Reproducible scaling laws for contrastive language-image learning", In Proceedings of the IEEE/CVF Conference on Computer Vision and Pattern Recognition, pp. 2818-2829, 2023, 12 pages.

Deng, et al., "ImageNet: A Large-Scale Hierarchical Image Database", In 2009 IEEE Computer Society Conference on Computer Vision and Pattern Recognition (CVPR 2009), Jun. 20, 2009, 8 pages.

Dosovitskiy, et al., "An Image is Worth 16×16 Words: Transformers for Image Recognition at Scale", arXiv preprint arXiv:2010.11929v1 [cs.CV] Oct. 22, 2020, 21 pages.

Fagin, et al., "Comparing Top k Lists", In SIAM Journal on Discrete Mathematics, vol. 17, No. 1, pp. 134-160, 2003, 27 pages.

Fan, et al., "Improving CLIP Training with Language Rewrites", arXiv preprint arXiv:2305.20088v2 [cs.CV] Oct. 28, 2023, 32 pages.

Feng, et al., "Training-Free Structured Diffusion Guidance for Compositional Text-to-Image Synthesis", arXiv preprint arXiv:2212.05032v3 [cs.CV] Feb. 28, 2023, 21 pages.

Gao, et al., "SimCSE: Simple Contrastive Learning of Sentence Embeddings", In Proceedings of the 2021 Conference on Empirical Methods in Natural Language Processing, pp. 6894-6910, Nov. 7, 2021, 17 pages.

Jaccard, "The Distribution of the Flora in the Alpine Zone", In New Phytologist, vol. 11, No. 2, pp. 37-50, Feb. 29, 1912, 14 pages.

Lin, et al., "Microsoft COCO: Common Objects in Context", In Computer Vision—ECCV 2014: 13th European Conference, Zurich, Switzerland, Proceedings, Part V, pp. 740-755, Sep. 6, 2014, 16 pages.

Liu, et al., "RoBERTa: A Robustly Optimized BERT Pretraining Approach", arXiv preprint arXiv:1907.11692v1 [cs.CL] Jul. 26, 2019, 13 pages.

Loshchilov and Hutler., "Decoupled Weight Decay Regularization", arXiv preprint arXiv:1711.05101v3 [cs.LG] Jan. 4, 2019, 19 pages.

Marelli, et al., "A SICK cure for the evaluation of compositional distributional semantic models", In Proceedings of the Ninth International Conference on Language Resources and Evaluation (LREC'14), pp. 216-223, 2014, 8 pages.

Van den Oord, et al., "Representation Learning with Contrastive Predictive Coding", arXiv preprint arXiv:1807.03748v2 [cs.LG] Jan. 22, 2019, 13 pages.

OpenAI, "Introducing ChatGPT", Nov. 30, 2022, available at https://openai.com/index/chatgpt/.

Plummer, et al., "Flickr30k Entities: Collecting Region-to-Phrase Correspondences for Richer Image-to-Sentence Models", In Proceedings of the IEEE International Conference on Computer Vision, pp. 2641-2649, 2015, 9 pages.

Radford, et al., "Learning Transferable Visual Models from Natural Language Supervision", arXiv preprint arXiv:2103.00020v1 [cs.CV] Feb. 26, 2021, 48 pages.

Rombach, et al., "High-Resolution Image Synthesis with Latent Diffusion Models", In Proceedings of the IEEE/CVF Conference on Computer Vision and Pattern Recognition, pp. 10684-10695, 2022, 12 pages.

Saharia, et al., "Photorealistic Text-to-Image Diffusion Models with Deep Language Understanding", arXiv preprint arXiv:2205.11487v1 [cs.CV] May 23, 2022, 46 pages.

Schuhmann, et al., "Laion-5B: An open large-scale dataset for training next generation image-text models", arXiv preprint arXiv:2210.08402v1 [cs.CV] Oct. 16, 2022, 50 pages.

Schuhmann, et al., "Laion-400M: Open Dataset of CLIP-Filtered 400 Million Image-Text Pairs", arXiv preprint arXiv:2111.02114v1 [cs.CV] Nov. 3, 2021, 5 pages.

Touvron, et al., "LLaMA: Open and Efficient Foundation Language Models", arXiv preprint arXiv:2302.13971v1 [cs.CL], Feb. 27, 2023, 27 pages.

Yuksekgonul, et al., "When and Why Vision-Language Models Behave Like Bags-Of-Words, and What to Do About It?", In The Eleventh International Conference on Learning Representations (ICLR 2023), pp. 1-20, May 1, 2023, 20 pages.

* cited by examiner

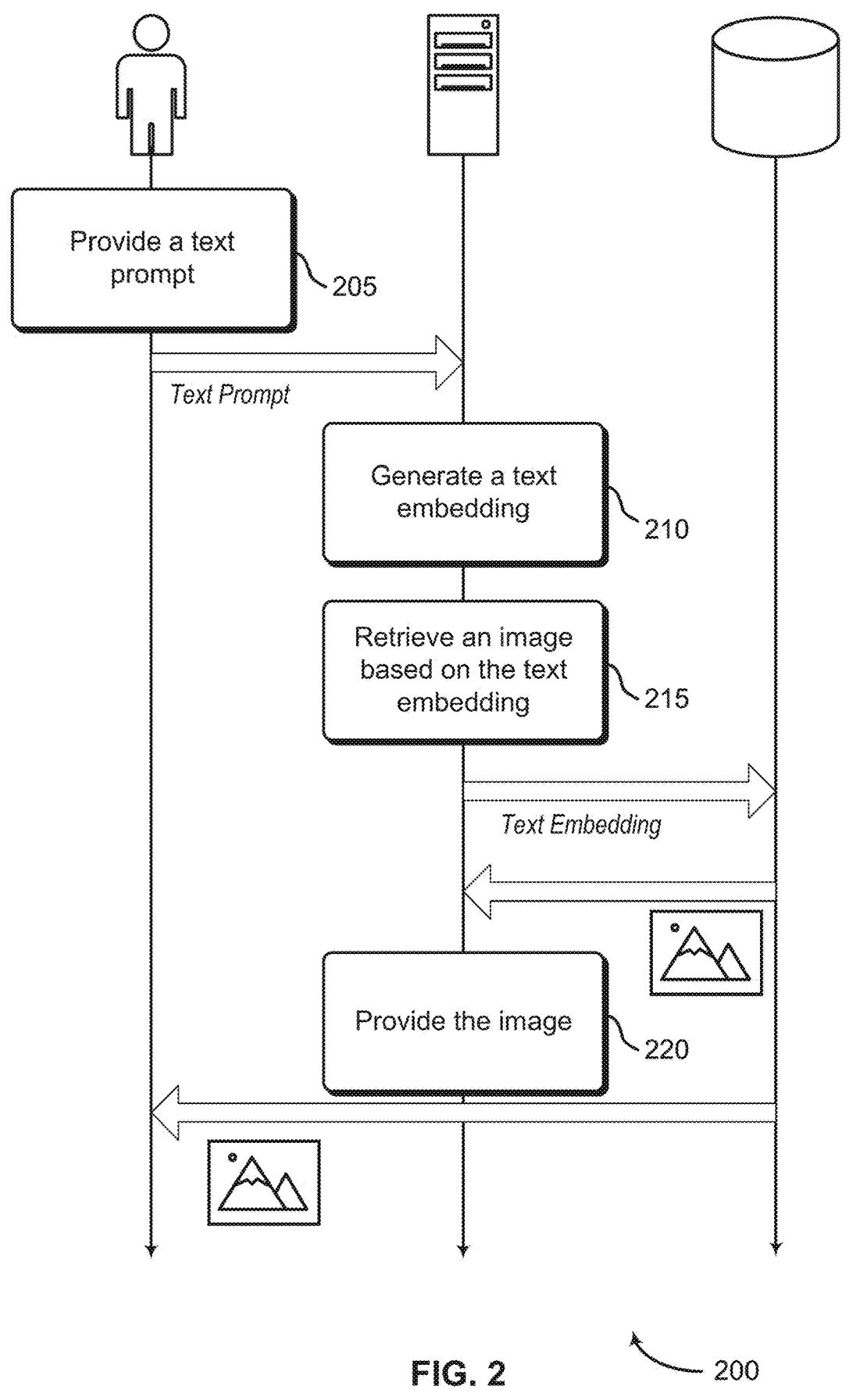

Provide a text prompt
205
*Text Prompt*
Generate a text embedding
210
Retrieve an image based on the text embedding
215
*Text Embedding*
Provide the image
220

FIG. 2
200

Figure 13:
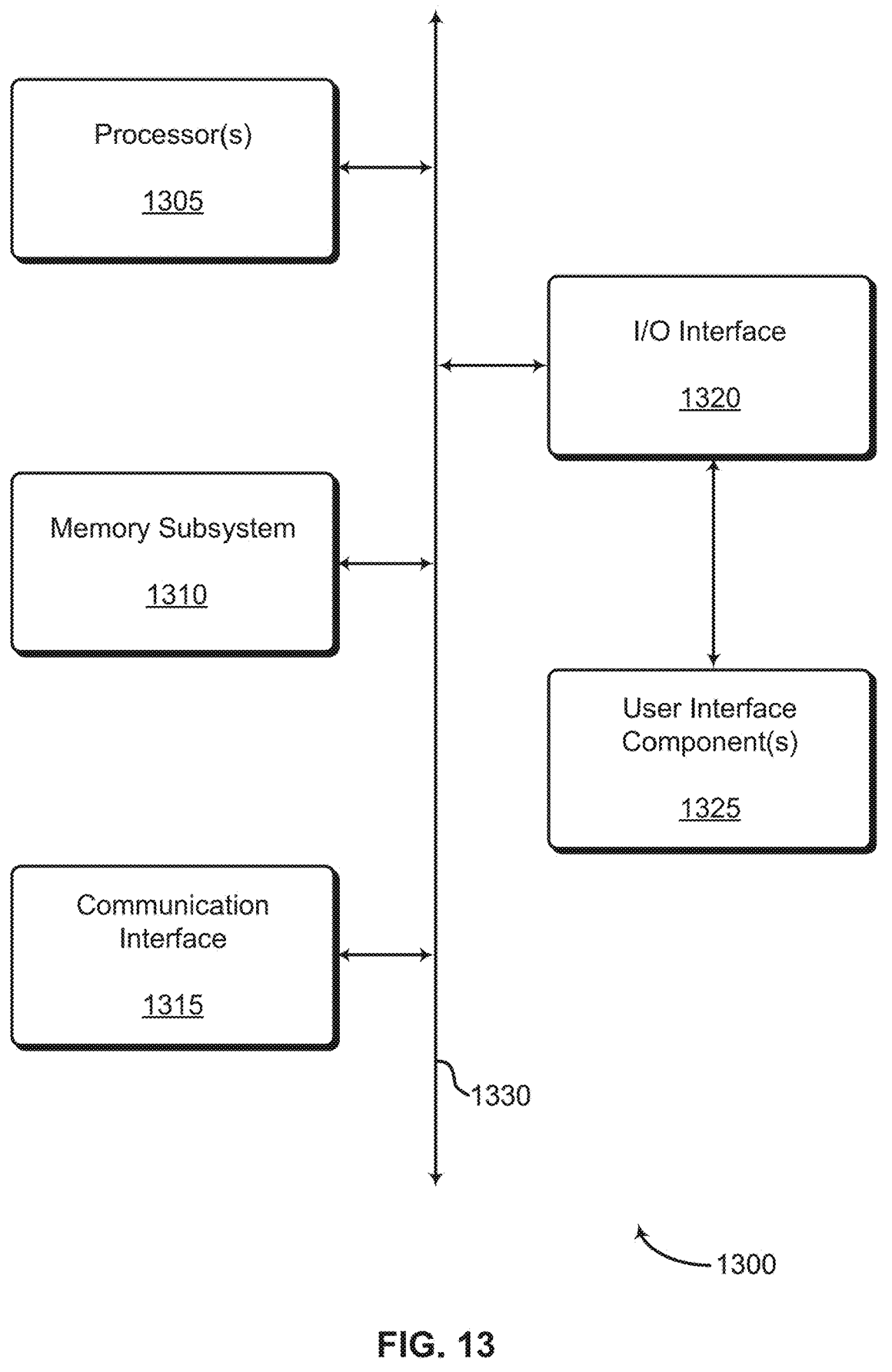

Processor(s)
1305

I/O Interface
1320

Memory Subsystem
1310

User Interface Component(s)
1325

Communication Interface
1315

TEXT-BASED IMAGE RETRIEVAL

BACKGROUND

Machine learning models may function as encoders by generating a vector representation of an input in a vector space. Multi-modal encoders are machine learning models that are trained to generate vector representations of inputs from different modalities (e.g., a text input and an image input) in one multi-modal vector space so that the different vector representations, and therefore the different inputs, may be effectively compared with each other across modalities.

Multi-modal encoders may be employed in text-based image retrieval tasks by providing a vector representation of a text input that is used to identify a matching vector representation of an image, and therefore an image that matches the text prompt. However, conventional multi-modal encoders are unable to effectively deal with linguistic variations in text queries, such as paraphrases, and therefore are unable to retrieve accurate image results for a broad range of user queries in real-world applications.

SUMMARY

Systems and methods are described for obtaining an image based on a text embedding of a text prompt. In one example, a media processing system uses a multi-modal encoder to generate the text embedding based on the text prompt. The multi-modal encoder is trained based on a similarity between a caption of a training image and a paraphrase of the caption where the caption and the paraphrase describe the same content of the training image using different phrasing. The multi-modal encoder is therefore able to generate closely spaced text embeddings for text prompts that describe similar content but are phrased differently. The closely spaced text embeddings allow a same image to be obtained in response to each of the text prompts. The media processing system therefore regularizes a text-based image retrieval process to account for the fact that different users may express a same idea using different language.

By contrast, conventional multi-modal encoders are not trained based on similarity between a caption and a paraphrase of the caption, and therefore generate relatively distant text embeddings for text prompts that describe similar content but are phrased differently. A conventional media processing systems that uses a conventional multi-modal encoder is therefore unable to consistently retrieve a same image based on the distantly spaced text embeddings, and therefore does not account for linguistic variation among user queries.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The Detailed Description is described with reference to the accompanying figures. Entities represented in the figures are indicative of one or more entities and thus reference is made interchangeably to single or plural forms of the entities in the discussion.

FIG. 2 shows an example of a method for obtaining a media item using a text embedding according to aspects of the present disclosure.

FIG. 13 shows an example of a computing device according to aspects of the present disclosure.

DETAILED DESCRIPTION

Overview

Figure 1:
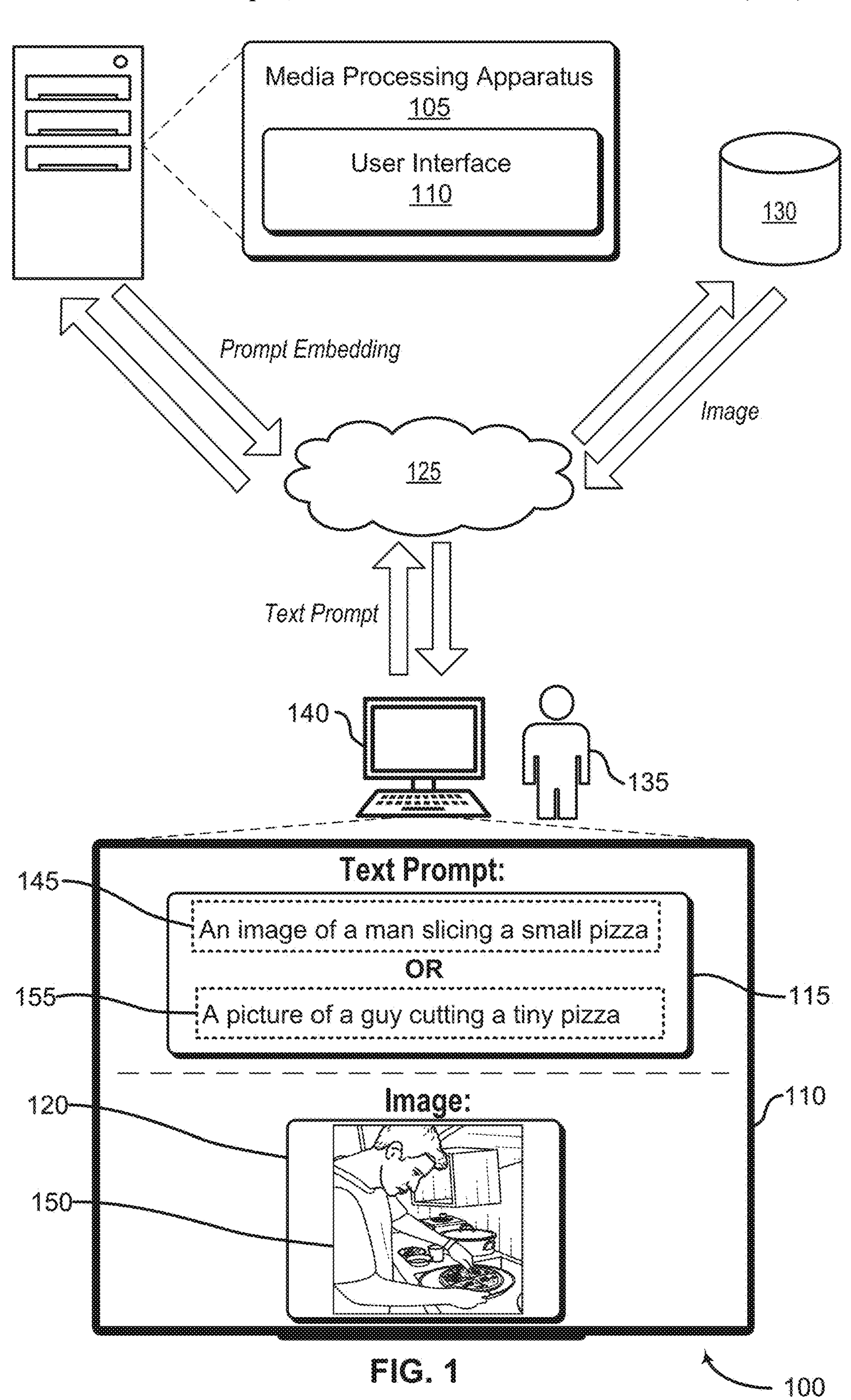
FIG. 1 shows an example of a media processing system that employs a multi-modal encoding method according to aspects of the present disclosure.

Aspects of the present disclosure provide systems and methods for obtaining an image based on a text embedding of a text prompt. Machine learning models may function as encoders by generating a vector representation of an input in a vector space. Multi-modal encoders are machine learning models that are trained to generate vector representations of inputs from different modalities (e.g., a text input and an image input) in one multi-modal vector space so that the different vector representations, and therefore the different inputs, may be effectively compared with each other across modalities.

Multi-modal encoders may be employed in text-based image retrieval tasks by providing a vector representation of a text input that is used to identify a matching vector representation of an image, and therefore an image that matches the text prompt. However, conventional multi-modal encoders are unable to effectively deal with linguistic variations in text queries, such as paraphrases, and therefore are unable to retrieve accurate image results for a broad range of user queries in real-world applications.

For example, conventional multi-modal encoders may be trained based on a similarity between an image and a caption of the image or a similarity between the image and a rewritten caption (i.e., an image-to-text comparison). Conventional multi-modal encoders are unable to comprehend some linguistic variations among text prompts, and therefore generate text embeddings that are relatively far apart in the multi-modal embedding space for text prompts that describe same content using different phrasings from each other. Consequently, a conventional media processing system employing a conventional multi-modal encoder is unable to consistently retrieve a same image for different text prompts having similar meanings due to the far-apart text embeddings generated by the conventional multi-modal encoder, as the far-apart text embeddings may most closely match with different image embeddings of different images in the multi-modal embedding space.

By contrast, a media processing system according to an aspect of the present disclosure uses a multi-modal encoder to generate a text embedding for a text prompt in a multi-modal embedding space, where the multi-modal encoder is trained based on a similarity between a caption of a training image and a paraphrase of the caption. The caption describes content of the training image and the paraphrase conveys a similar meaning and/or intention as the caption using different vocabulary and/or syntax from the caption.

Because the multi-modal encoder is trained based on the similarity between the caption and the paraphrase (e.g., a text-to-text comparison), the multi-modal encoder understands diverse synonyms and paraphrases in practical scenarios, and is therefore able to generate text embeddings that are close to each other in the multi-modal embedding space for text prompts that describe same content using different phrasings from each other. Accordingly, the media processing apparatus is able to retrieve, based on the closely spaced text embeddings, a same image for different text prompts having similar meanings, as the closely spaced text embeddings will both most closely match with a same image embedding of the image in the multi-modal embedding space.

Furthermore, according to some aspects, the multi-modal encoder is trained based on a similarity between the paraphrase and a paraphrase of the paraphrase, which further reduces a distance between text embeddings generated based on similar text prompts and therefore further increases an accuracy of the media processing system.

Accordingly, embodiments of the present disclosure improve image retrieval technology by providing a multi-modal encoder that generates a more accurate text embedding of a text prompt than conventional multi-modal encoders, which allows for more accurate image results to be retrieved based on the text embedding.

An example of the present disclosure is used in an image retrieval context. In the example, a first user provides a first text prompt "An image of a man slicing a small pizza" to a user interface of a media processing system, and a second user provides a second text prompt "A picture of a guy cutting a tiny pizza" to the user interface. The first text prompt and the second text prompt therefore describe the same content using different phrasing. The media processing system uses a multi-modal encoder to generate a first text embedding and a second text embedding based on the first text prompt and the second text prompt, respectively. Because the multi-modal encoder is trained based on image captions and paraphrases of the image captions, and therefore understands linguistic variations associated with paraphrases, the first text embedding and the second text embedding are close together in an embedding space.

Because the first text embedding and the second text embedding are close together, they both match most closely with a same image embedding stored in a database of the media processing system. The media processing system retrieves an image that corresponds to the image embedding from the database and provides the image to the first user and the second user.

Further example applications of the present disclosure in the image retrieval context are provided with reference to FIGS. 1-4. Details regarding the architecture of the media processing system are provided with reference to FIGS. 1-6 and 13-14. Examples of a process for obtaining an image based on a text embedding are provided with reference to FIGS. 2 and 6-7. Examples of a process for training a machine learning model are provided with reference to FIGS. 8-12.

Media Processing System

A media processing system is described with reference to FIGS. 1-5. FIG. 1 shows an example of a media processing system 100 that employs a multi-modal encoding method according to aspects of the present disclosure. The example shown includes media processing system 100, user 135, user device 140, text prompt 145, image 150, and alternate text prompt 155. Media processing system 100 is an example of, or includes aspects of, the corresponding element described with reference to FIGS. 3, 4, and 9-11.

In one aspect, media processing system 100 includes media processing apparatus 105, cloud 125, and database 130. Media processing apparatus 105 is an example of, or includes aspects of, the corresponding element described with reference to FIGS. 3, 4, 9-11, and 14. In one aspect, media processing apparatus 105 includes user interface 110. In one aspect, user interface 110 includes prompt element 115 and image element 120. User interface 110 is an example of, or includes aspects of, the corresponding element described with reference to FIGS. 3 and 4.

In the example of FIG. 1, user interface 110 obtains a text prompt (e.g., text prompt 145, displayed in prompt element 115) from user 135 via user device 140. Text prompt 145 describes the content of "An image of a man slicing a small pizza". Media processing apparatus 105 uses a multi-modal encoder (such as the multi-modal encoder 315 described with reference to FIG. 3) to generate a text embedding based on the text prompt. Media processing apparatus 105 then finds an image embedding (such as the image embedding 345 described with reference to FIG. 3) in database 130 that most closely matches the text embedding (e.g., is least distant from the text embedding) in a multi-modal embedding space.

Media processing apparatus 105 retrieves an image (e.g., image 150) from database 130 that corresponds to the image embedding. Because the image corresponds to the image embedding that matches the text embedding of the text prompt, the image depicts the content described by the text prompt. For example, image 150 depicts a man slicing a small pizza. User interface 110 displays the retrieved image in image element 120.

In the example of FIG. 1, alternatively, user 135 provides alternate text prompt 155 to media processing apparatus 105 instead of text prompt 145, where alternate text prompt 155 describes the same content as text prompt 145 using an alternate phrasing (e.g., "A picture of a guy cutting a tiny pizza"). Media processing apparatus 105 generates an alternate text embedding based on alternate text prompt 155 using the multi-modal encoder. In the example, because the multi-modal encoder is trained based on a similarity between an image caption and a paraphrase of the image caption (for example, as described with reference to FIGS. 8-12), the multi-modal encoder generates semantically similar text embeddings based on semantically similar text prompts, and therefore a same image embedding is matched with both the text embedding and the alternate text embedding. Image 150 is therefore capable of being retrieved based on alternate text prompt 155 as well. A comparative example is described in further detail with reference to FIG. 7.

According to some aspects, user device 140 is a personal computer, laptop computer, mainframe computer, palmtop computer, personal assistant, mobile device, or any other suitable processing apparatus. User device 140 may include software that displays user interface 110. User interface 110 allows information (such as images, prompts, etc.) to be communicated between user 135 and media processing apparatus 105.

According to some aspects, a user device user interface enables user 135 to interact with user device 140. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

According to some aspects, media processing apparatus 105 includes a computer-implemented network. In some embodiments, the computer-implemented network includes a machine learning model (such as the multi-modal encoder 315 described with reference to FIG. 3, the image generation model 415 described with reference to FIG. 4, and the language generation model 1110 described with reference to FIG. 11).

Media processing apparatus 105 may also include one or more processors, a memory subsystem, a communication interface, an I/O interface, one or more user interface components, and a bus as described with reference to FIG. 13. Additionally, media processing apparatus 105 may communicate with user device 140 and database 130 via cloud 125.

According to some aspects, media processing apparatus 105 is implemented on a server. A server provides one or more functions to users linked by way of one or more of various networks, such as cloud 125. The server may include a microprocessor board that includes a microprocessor responsible for controlling all aspects of the server. The server uses the microprocessor and protocols such as hypertext transfer protocol (HTTP), simple mail transfer protocol (SMTP), file transfer protocol (FTP), and simple network management protocol (SNMP) to exchange data with other devices or users on one or more of the networks. The server may be configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of a media processing system is provided with reference to FIGS. 2-5 and 13-14. Further detail regarding a process for obtaining an image based on a text embedding generated by the multi-modal encoder is provided with reference to FIGS. 6-7. Further detail regarding a process for training a machine learning model is provided with reference to FIGS. 8-12.

Cloud 125 is a computer network configured to provide on-demand availability of computer system resources, such as data storage and computing power. Cloud 125 may provide resources without active management by a user. The term "cloud" is sometimes used to describe data centers available to many users over the Internet. Some large cloud networks have functions distributed over multiple locations from central servers. A server is designated an edge server if the server has a direct or close connection to a user. Cloud 125 may be limited to a single organization or be available to many organizations. In one example, cloud 125 includes a multi-layer communications network comprising multiple edge routers and core routers. In another example, cloud 125 is based on a local collection of switches in a single physical location. According to some aspects, cloud 125 provides communications between user device 140, media processing apparatus 105, and database 130.

According to some aspects, database 130 stores the image embedding. Database 130 is an organized collection of data. In an example, database 130 stores data in a specified format known as a schema. According to some aspects, database 130 is structured as a single database, a distributed database, multiple distributed databases, or an emergency backup database. A database controller may manage data storage and processing in database 130. A user may interact with the database controller, or the database controller may operate automatically without interaction from the user. According to some aspects, database 130 is included in media processing apparatus 105. According to some aspects, database 130 is external to media processing apparatus 105 and communicates with media processing apparatus 105 via cloud 125. Database 130 is an example of, or includes aspects of, the corresponding element described with reference to FIG. 3.

Text prompt 145 and alternate text prompt 155 are examples of, or include aspects of, the text prompt 335 described with reference to FIG. 3. Image 150 is an example of, or includes aspects of, the corresponding element described with reference to FIGS. 3 and 7.

FIG. 2 shows an example of a method 200 for obtaining a media item using a text embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In the example of FIG. 2, a user (such as the user 135 described with reference to FIG. 1) instructs a media processing system (such as the media processing system 100 described with reference to FIG. 1) to retrieve an image based on a text prompt describing the image. In an example, the user provides the text prompt to a media processing apparatus of the media processing system (such as the media processing apparatus 105 described with reference to FIG. 1). The media processing apparatus embeds the text prompt and retrieves an image from a database (such as the database 130 described with reference to FIG. 1) using the embedded text prompt. The media processing apparatus provides the retrieved image to the user.

At operation 205, the system provides a text prompt. In some cases, the operations of this step refer to, or may be performed by, a user as described with reference to FIG. 1. In an example, the user enters the text prompt into a user interface (e.g., the user interface 110 described with reference to FIG. 1) provided by the media processing apparatus on a user device (e.g., the user device 140 described with reference to FIG. 1).

At operation 210, the system generates a text embedding. In some cases, the operations of this step refer to, or may be performed by, a media processing apparatus as described with reference to FIGS. 1, 3, 4, 9-11, and 14. In an example, the media processing apparatus generates the text embedding using a multi-modal encoder as described with reference to FIG. 3. In some embodiments, the multi-modal encoder is trained as described with reference to FIGS. 8-12.

At operation 215, the system retrieves an image based on the embedding. In some cases, the operations of this step refer to, or may be performed by, a media processing apparatus as described with reference to FIGS. 1, 3, 4, 9-11, and 14. In an example, the media processing apparatus retrieves the image from the database as described with reference to FIG. 3.

At operation 220, the system provides the image to the user. In some cases, the operations of this step refer to, or may be performed by, a media processing apparatus as described with reference to FIGS. 1, 3, 4, 9-11, and 14. In an example, the user interface displays the retrieved image.

Figure 3:
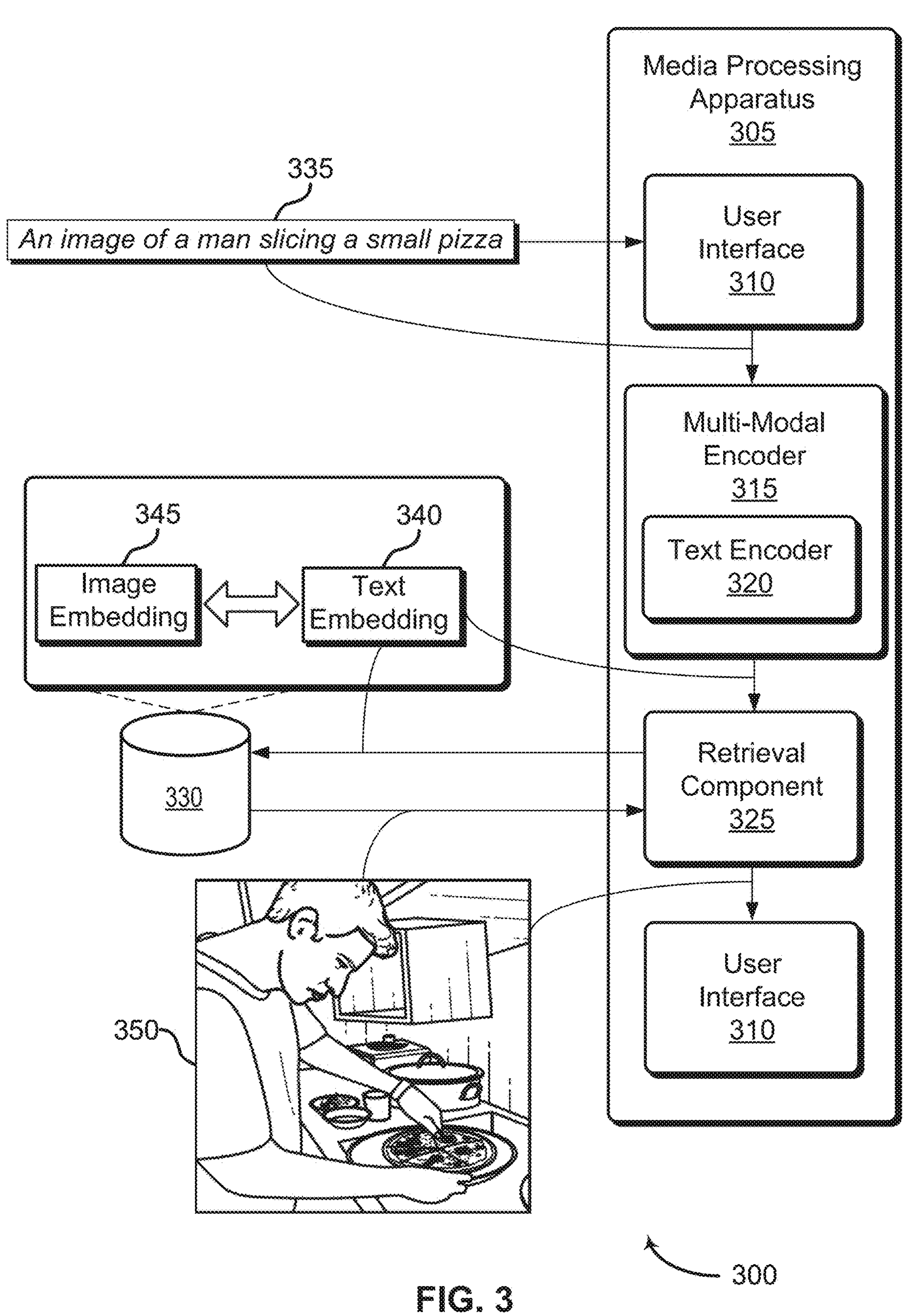
FIG. 3 shows an example of a media processing system for obtaining an image using a multi-modal encoding method according to aspects of the present disclosure.

FIG. 3 shows an example of a media processing system for obtaining an image using a multi-modal encoding method according to aspects of the present disclosure. The example shown includes media processing system 300, text prompt 335, text embedding 340, image embedding 345, and image 350.

Media processing system 300 is an example of, or includes aspects of, the corresponding element described with reference to FIGS. 1, 4, and 9-11. In one aspect, media processing system 300 includes media processing apparatus 305 and database 330. Media processing apparatus 305 is an example of, or includes aspects of, the corresponding element described with reference to FIGS. 1, 4, 9-11, and 14. Database 330 is an example of, or includes aspects of, the corresponding element described with reference to FIG. 1.

In one aspect, media processing apparatus 305 includes user interface 310, multi-modal encoder 315, and retrieval component 325. User interface 310 is an example of, or includes aspects of, the corresponding element described with reference to FIGS. 1 and 4. Multi-modal encoder 315 is an example of, or includes aspects of, the corresponding element described with reference to FIGS. 4, 9, 10, and 14. In one aspect, multi-modal encoder 315 includes text encoder 320. Text encoder 320 is an example of, or includes aspects of, the corresponding element described with reference to FIGS. 9 and 10.

In the example of FIG. 3, user interface 310 receives a text prompt describing content (e.g., text prompt 335). Text encoder 320 generates a text embedding (e.g., text embedding 340) based on the text prompt. An "embedding" refers to a representation of an object (e.g., the text prompt) in a lower-dimensional space such that semantic information about the object is more easily captured and analyzed by a machine learning model. For example, the embedding is a numerical representation of the object in a continuous vector space in which objects that include similar semantic information to each other correspond to vectors that are numerically similar to and thus "closer" to each other, thereby allowing a similarity between different objects corresponding to different embeddings to be readily determined. A "text embedding" refers to an embedding of the text prompt, e.g., a representation of the text prompt in an embedding space.

An "embedding space" (or a "vector space") refers to a set having embeddings (or vectors) as elements, and is characterized by a dimension specifying a number of independent directions in the embedding space. According to some aspects, the embedding space is a multi-modal embedding space that is shared by text embeddings and image embeddings, such that a text embedding and an image embedding may be compared with each other.

In some examples, text encoder 320 tokenizes the text prompt to obtain a sequence of tokens representing the content and generates the text embedding based on the sequence of tokens. Tokenization refers to a process for converting a text string input into a sequence of token representations of a word, sub-word, or character. In some examples, tokenizing the text prompt includes cleaning the text prompt by removing any characters, punctuation, or special symbols that do not contribute to the meaning of the natural language query, splitting the text prompt into individual tokens representing words, sub-words, or characters of the text prompt, and adding start-of-sequence and end-of-sequence special tokens to denote the beginning and the end of the token sequence, respectively. Tokenization can include adding padding tokens to the token sequence, or truncating the token sequence, where an attention mask is generated to indicate which tokens are actual words and which ones are padding tokens. Each token in the token sequence is converted to a unique integer identifier based on the embedding model's vocabulary. Finally, the token sequence including the unique integer identifiers is converted by the multi-modal encoder into the text embedding in the vector space.

A "multi-modal encoder" refers to a machine learning model that is trained to generate embeddings for multiple inputs in multiple modalities (such as a text modality and an image modality) in one multi-modal embedding space.

Multi-modal encoder 315 comprises encoding parameters stored in a memory unit, such as the memory unit 1410 described with reference to FIG. 14. Text encoder 320 comprises text encoding parameters stored in the memory unit. According to some aspects, text encoder 320 comprises a recurrent neural network (RNN). An RNN is a class of artificial neural network (ANN) in which connections between nodes form a directed graph along an ordered (i.e., a temporal) sequence, enabling the RNN to model temporally dynamic behavior such as predicting what element should come next in a sequence. Thus, an RNN is suitable for tasks that involve ordered sequences, such as text recognition (where words are ordered in a sentence). The term "RNN" may include finite impulse recurrent networks (characterized by nodes forming a directed acyclic graph), and infinite impulse recurrent networks (characterized by nodes forming a directed cyclic graph).

According to some aspects, text encoder 320 comprises a transformer. According to some aspects, a transformer comprises one or more ANNs comprising attention mechanisms that enable the transformer to weigh an importance of different words or tokens within a sequence. In some examples, a transformer processes entire sequences simultaneously in parallel, making the transformer highly efficient and allowing the transformer to capture long-range dependencies more effectively.

According to some aspects, a transformer comprises an encoder-decoder structure. The encoder of the transformer processes an input sequence and encodes the input sequence into a set of high-dimensional representations. The decoder of the transformer generates an output sequence based on the encoded representations and previously generated tokens. The encoder and the decoder each include one or more layers of self-attention mechanisms and feed-forward ANNs.

The self-attention mechanism allows the transformer to focus on different parts of an input sequence while computing representations for the input sequence. The self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. NLP tasks can involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features to express the relative probability of multiple answers.

Some sequence models process an input sequence sequentially, maintaining an internal hidden state that captures information from previous steps. However, this sequential processing can lead to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

According to some aspects, an ANN employing an attention mechanism receives an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

By incorporating an attention mechanism, an ANN dynamically allocates attention to different parts of the input sequence, allowing the ANN to focus on relevant information and capture dependencies across longer distances.

According to some aspects, multi-modal encoder 315 comprises a contrastive language-image pre-training (CLIP) model that is fine-tuned based on a similarity between a caption of a training image and a paraphrase of the caption.

Multi-modal encoder 315 and text encoder 320 are trained, as described with reference to FIGS. 8-12, to encode image descriptions based on a similarity between a caption of a training image and a paraphrase of the caption.

Retrieval component 325 identifies an image embedding (e.g., image embedding 345) stored in database 330 by comparing the text embedding and the image embedding. For example, the image embedding is included in the multi-modal embedding space with the text embedding, which enables retrieval component 325 to determine a distance between the image embedding and the text embedding. In some embodiments, the image embedding is generated by multi-modal encoder 315 prior to being stored in database 330.

Retrieval component 325 determines that the distance is less than a threshold distance, or that the distance is lower than distances between the text embedding and the other image embeddings stored in database 330. Retrieval component 325 identifies an image (e.g., image 350) stored in database 330 that corresponds to the image embedding. Retrieval component 325 may likewise identify a set of image embeddings, and corresponding images, that are similar to the text embedding based on the threshold distance. Retrieval component 325 retrieves the identified image, or the identified set of the images, from database 330. User interface 310 displays the image, or the set of images.

Referring to FIG. 3, text prompt 335 describes the content "An image of a man slicing a small pizza". Media processing apparatus 305 generates text embedding 340 based on text prompt 335, and determines that image embedding 345 is sufficiently similar to text embedding 340 to be considered to match with text embedding 340. Media processing apparatus 305 retrieves image 350 from database 330 based on the determination. Image 350 depicts content described by text prompt 335, a man slicing a small pizza.

Text prompt 335 is an example of, or includes aspects of, the corresponding element described with reference to FIG. 1. Text embedding 340 is an example of, or includes aspects of, the corresponding element described with reference to FIG. 4. Image 350 is an example of, or includes aspects of, the corresponding element described with reference to FIGS. 1 and 7.

Figure 4:
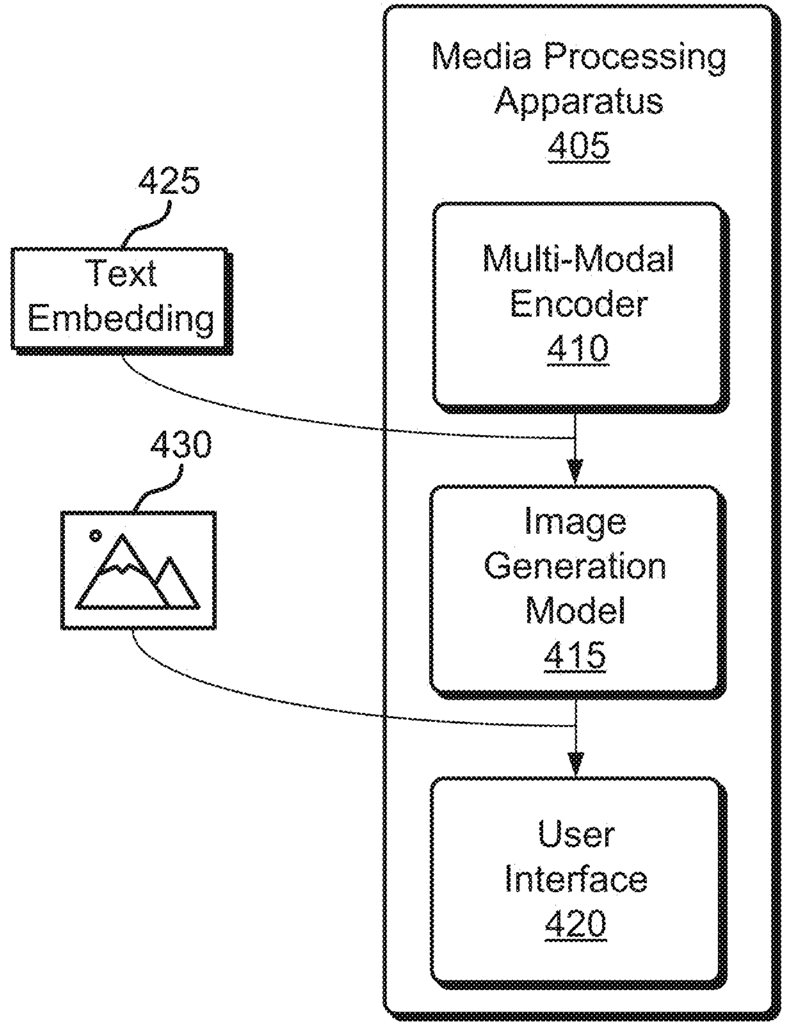
FIG. 4 shows an example of a media processing system for generating an image according to aspects of the present disclosure.

FIG. 4 shows an example of a media processing system for generating an image according to aspects of the present disclosure. The example shown includes media processing system 400, text embedding 425, and image 430.

Media processing system 400 is an example of, or includes aspects of, the corresponding element described with reference to FIGS. 1, 3, and 9-11. In one aspect, media processing system 400 includes media processing apparatus 405. Media processing apparatus 405 is an example of, or includes aspects of, the corresponding element described with reference to FIGS. 1, 3, 9-11, and 14. In one aspect, media processing apparatus 405 includes multi-modal encoder 410, image generation model 415, and user interface 420. Multi-modal encoder 410 is an example of, or includes aspects of, the corresponding element described with reference to FIGS. 3, 9, 10, and 14. User interface 420 is an example of, or includes aspects of, the corresponding element described with reference to FIGS. 1 and 3. Text embedding 425 is an example of, or includes aspects of, the corresponding element described with reference to FIG. 3.

In the example of FIG. 4, multi-modal encoder 410 generates a text embedding (e.g., text embedding 425) as described with reference to FIG. 3. Compared with FIG. 3, rather than obtaining an image by retrieving the image from a database based on the text embedding, multi-modal encoder 410 provides the text embedding to image generation model 415, and image generation model 415 generates the image (e.g., image 430) based on the text embedding. User interface 420 displays the image. According to some aspects, because multi-modal encoder 410 is trained as described with reference to FIGS. 8-12, multi-modal encoder 410 outputs similar text embeddings for alternate text prompts that describe same content, and so the image generated by image generation model 415 is similar for the alternate text prompts.

According to some aspects, image generation model 415 comprises image generation parameters stored in the memory unit 1410 described with reference to FIG. 14. According to some aspects, image generation model 415 comprises a machine learning model trained to generate the image based on the text embedding. For example, image generation model 415 may comprise a diffusion model, a generative adversarial network (GAN), or other suitable machine learning model. A diffusion model transforms an initial random noise input into a coherent and realistic image through an iterative denoising process conditioned on the text embedding. A GAN iteratively outputs images based on the text embedding using a generator network until a discriminator network is unable to identify the most recently generated image as being a generated image.

Figure 5:
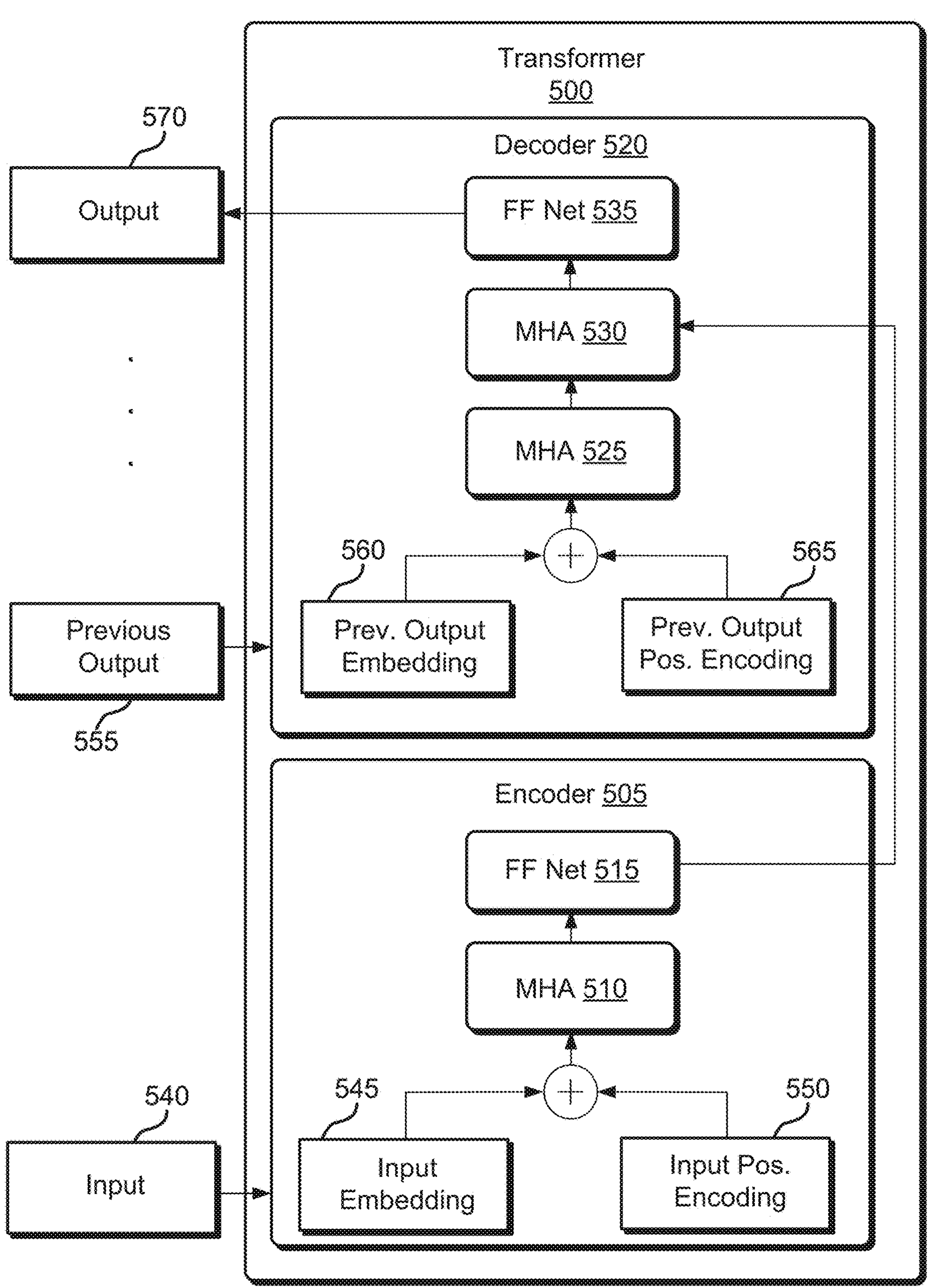
FIG. 5 shows an example of a transformer according to aspects of the present disclosure.

FIG. 5 shows an example of a transformer 500 according to aspects of the present disclosure. The example shown includes transformer 500, encoder 505, decoder 520, input 540, input embedding 545, input positional encoding 550, previous output 555, previous output embedding 560, previous output positional encoding 565, and output 570. According to some aspects, encoder 505 is implemented as a text encoder of a multi-modal encoder (such as the text encoder 320 of the multi-modal encoder 315 described with reference to FIG. 3). According to some aspects, encoder 505 is implemented as an image encoder of a multi-modal encoder (such as the image encoder 915 of the multi-modal encoder 910 described with reference to FIG. 9). According to some aspects, transformer 500 is implemented in a language generation model (such as the language generation model described with reference to FIG. 11). According to some aspects, transformer 500 is implemented in an image captioning network.

In some cases, encoder 505 includes multi-head self-attention sublayer 510 and feed-forward network sublayer 515. In some cases, decoder 520 includes first multi-head self-attention sublayer 525, second multi-head self-attention sublayer 530, and feed-forward network sublayer 535.

In some cases, encoder 505 is configured to map input 540 (for example, a text prompt) to a sequence of continuous representations that are fed into decoder 520. In some cases, decoder 520 generates output 570 (e.g., a prediction of an output sequence of words or tokens) based on the output of encoder 505 and previous output 555 (e.g., a previously predicted output sequence), which allows for the use of autoregression.

For example, in some cases, encoder 505 parses input 540 into tokens and vectorizes the parsed tokens to obtain input embedding 545, and adds input positional encoding 550 (e.g., positional encoding vectors for input 540 of a same dimension as input embedding 545) to input embedding 545. In some cases, input positional encoding 550 includes information about relative positions of words or tokens in input 540.

In some cases, encoder 505 comprises one or more encoding layers that generate contextualized token representations, where each representation corresponds to a token that combines information from other input tokens via self-attention mechanism. In some cases, each encoding layer of encoder 505 comprises a multi-head self-attention sublayer (e.g., multi-head self-attention sublayer 510). In some cases, the multi-head self-attention sublayer implements a multi-head self-attention mechanism that receives different linearly projected versions of queries, keys, and values to produce outputs in parallel. In some cases, each encoding layer of encoder 505 also includes a fully connected feed-forward network sublayer (e.g., feed-forward network sublayer 515) comprising two linear transformations surrounding a Rectified Linear Unit (ReLU) activation:

$$FFN(x) = ReLU(W_1 x + b_1)W_2 + b_2 \tag{1}$$

In some cases, each layer employs different weight parameters ($W_1$, $W_2$) and different bias parameters ($b_1$, $b_2$) to apply a same linear transformation to each word or token in input 540.

In some cases, each sublayer of encoder 505 is followed by a normalization layer that normalizes a sum computed between a sublayer input x and an output sublayer (x) generated by the sublayer:

$$layernorm(x + \text{sublayer}(x)) \tag{2}$$

In some cases, encoder 505 is bidirectional because encoder 505 attends to each word or token in input 540 regardless of a position of the word or token in input 540.

According to some aspects, encoder 505 functions as an image encoder of the multi-modal encoder (such as the image encoder 915 of the multi-modal encoder 910 described with reference to FIG. 9). In an example, the multi-modal encoder splits an input image into fixed-size patches, generates a linear embedding of each of the patches, adds position embeddings to each of the linear embeddings, and provides the resulting sequence of vectors as input 540 to encoder 505.

In some cases, decoder 520 comprises one or more decoding layers (e.g., six decoding layers). In some cases, each decoding layer comprises three sublayers including a first multi-head self-attention sublayer (e.g., first multi-head self-attention sublayer 525), a second multi-head self-attention sublayer (e.g., second multi-head self-attention sublayer 530), and a feed-forward network sublayer (e.g., feed-forward network sublayer 535). In some cases, each sublayer of decoder 520 is followed by a normalization layer that normalizes a sum computed between a sublayer input x and an output sublayer (x) generated by the sublayer.

In some cases, decoder 520 generates previous output embedding 560 of previous output 555 and adds previous output positional encoding 565 (e.g., position information for words or tokens in previous output 555) to previous output embedding 560. In some cases, each first multi-head self-attention sublayer receives the combination of previous output embedding 560 and previous output positional encoding 565 and applies a multi-head self-attention mechanism to the combination. In some cases, for each word in an input sequence, each first multi-head self-attention sublayer of decoder 520 attends only to words preceding the word in the sequence, and so a prediction of transformer 500 for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 505 by receiving a query Q from a previous sublayer of decoder 520 and a key K and a value V from the output of encoder 505, allowing decoder 520 to attend to each word in the input 540.

In some cases, each feed-forward network sublayer implements a fully connected feed-forward network similar to feed-forward network sublayer 515. In some cases, the feed-forward network sublayers are followed by a linear transformation and a softmax to generate a prediction of output 570.

Media Processing

Figure 6:
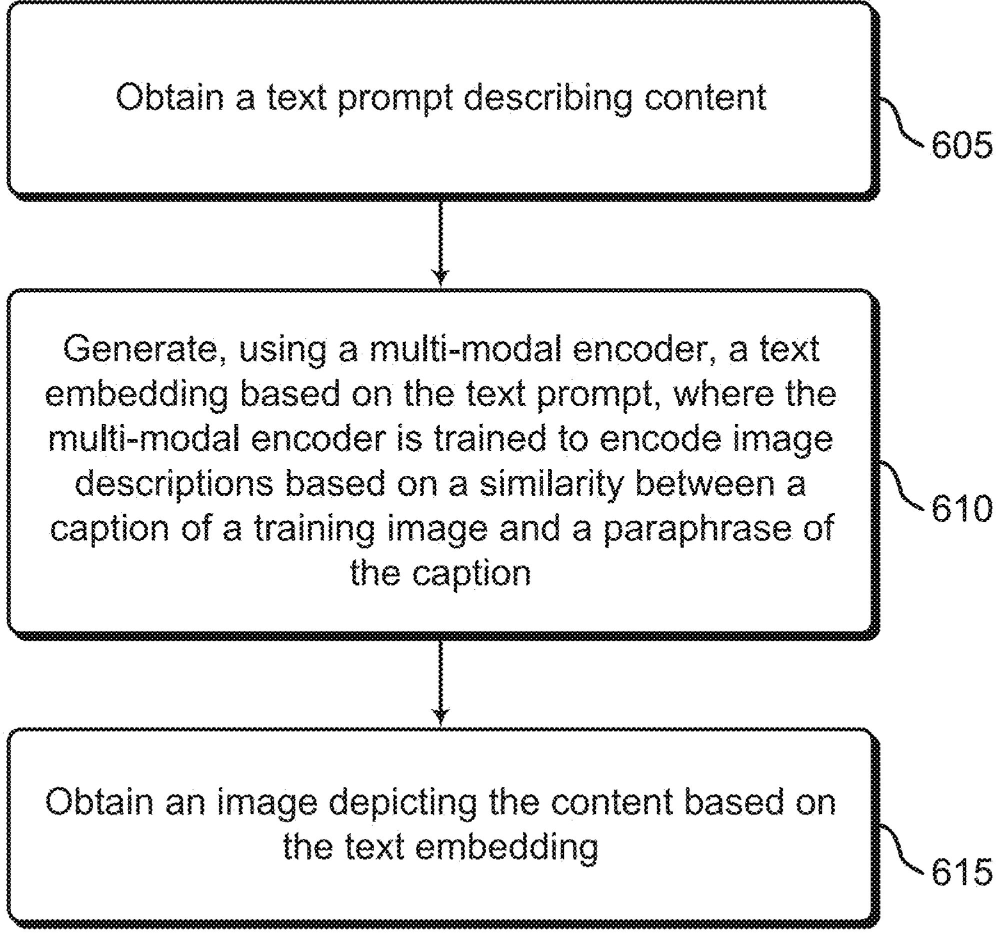
FIG. 6 shows an example of a method for obtaining an image using a text embedding according to aspects of the present disclosure.

A method for media processing is described with reference to FIGS. 6-7. FIG. 6 shows an example of a method 600 for obtaining an image using a text embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, a media processing apparatus (such as the media processing system 1400 described with reference to FIG. 14) uses a multi-modal encoder (such as the multi-modal encoder 1415 described with reference to FIG. 14) to generate a text embedding for a text prompt in a multi-modal embedding space, where the text prompt describes image content. A "multi-modal encoder" refers to a machine learning model that is trained to generate embeddings for multiple inputs in multiple modalities (such as a text modality and an image modality) in one multi-modal embedding space, such that objects from the multiple modalities may be effectively compared with each other. The media processing apparatus obtains an image based on the text embedding.

In some embodiments, the multi-modal encoder is trained based on a similarity between a caption of a training image and a paraphrase of the caption. As used herein, a "caption" refers to a text description of content of the training image. As used herein, "content" refers to any visual characteristic of the image, such as an object depicted in the image, a style for the image, etc. In some embodiments, a "paraphrase of the caption" refers to a text description of the content described by the caption using different language, phrasing, and/or syntax than the caption.

Because the multi-modal encoder is trained based on the similarity between the caption and the paraphrase, the multi-modal encoder better understands diverse synonyms and paraphrases in practical scenarios than conventional multi-modal encoders, and is therefore able to generate text embeddings that are close to each other in the multi-modal embedding space for text prompts that describe same content using different phrasings from each other. Accordingly, the media processing apparatus is able to retrieve, based on the close text embeddings, a same image for different text prompts having similar meanings, as the close text embeddings will both most closely match in the multi-modal embedding space with a same image embedding of the image. A comparative example of images obtained by a media processing system using variant text prompts is described with reference to FIG. 7.

At operation 605, the system obtains a text prompt describing content. In some cases, the operations of this step refer to, or may be performed by, a media processing apparatus as described with reference to FIGS. 1, 3, 4, 9-11, and 14. In an example, a user (such as the user 135 described with reference to FIG. 1) provides the text prompt to the media processing apparatus via a prompt element of a user interface (such as the prompt element 115 of the user interface 110 described with reference to FIG. 1).

At operation 610, the system generates, using a multi-modal encoder, a text embedding based on the text prompt, where the multi-modal encoder is trained to encode image descriptions based on a similarity between a caption of a training image and a paraphrase of the caption. In some cases, the operations of this step refer to, or may be performed by, a multi-modal encoder as described with reference to FIGS. 3, 4, 9, 10, and 14. In an example, the multi-modal encoder generates the text embedding using a text encoder of the multi-modal encoder as described with reference to FIG. 3. In an example, the multi-modal encoder is trained as described with reference to FIGS. 8-12.

At operation 615, the system obtains an image depicting the content based on the text embedding. In some cases, the operations of this step refer to, or may be performed by, a media processing apparatus as described with reference to FIGS. 1, 3, 4, 9-11, and 14. In one example, the media processing apparatus retrieves an image based on the text embedding as described with reference to FIG. 3. In another example, the media processing apparatus generates an image based on the text embedding using an image generation model as described with reference to FIG. 4. According to some aspects, the media processing apparatus displays the image to the user via the user interface.

Figure 7:
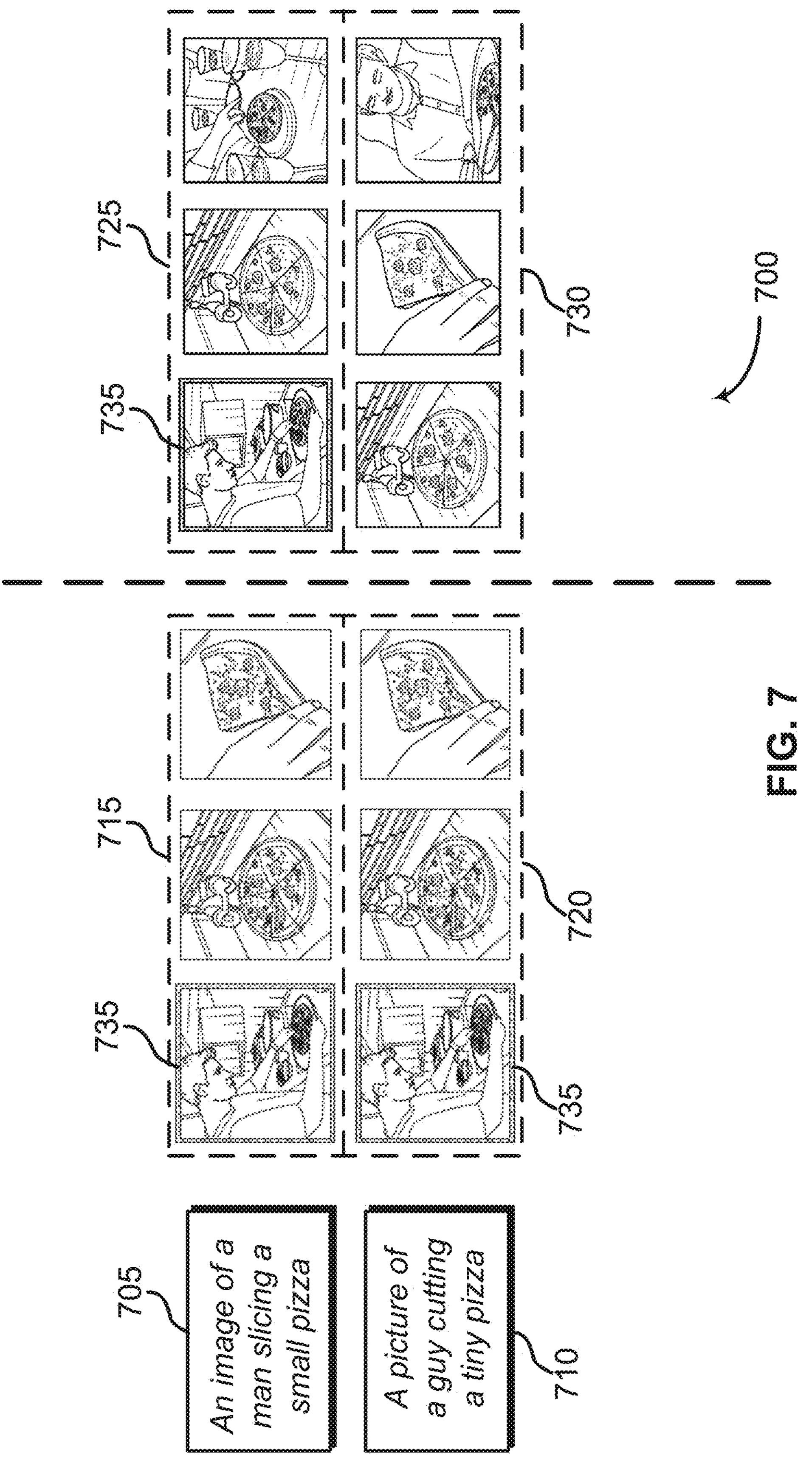
FIG. 7 shows a comparative example of images obtained by a media processing system using variant text prompts according to aspects of the present disclosure.

FIG. 7 shows a comparative example 700 of images obtained by a media processing system using variant text prompts according to aspects of the present disclosure. The example shown includes first variant text prompt 705, second variant text prompt 710, first set of retrieved images 715, second set of retrieved images 720, first comparative set of retrieved images 725, second comparative set of retrieved images 730, and gold image 735.

In the example of FIG. 7, first variant text prompt 705 describes content of an image ("An image of a man slicing a small pizza"), and second variant text prompt 710 is a paraphrase of first variant text prompt 705 ("A picture of a guy cutting a tiny pizza") because second variant text prompt 710 describes the same content as is described by first variant text prompt 705 using different phrasing.

First set of retrieved images 715 is an example of an ordered set of images retrieved by a media processing apparatus (such as the media processing apparatus 1400 described with reference to FIG. 14) based on a text embedding generated by a multi-modal encoder (such as the multi-modal encoder 1415 described with reference to FIG. 14) for first variant text prompt 705, and second set of retrieved images 720 is likewise an ordered set of images retrieved based on a text embedding of second variant text prompt 710. The images are presented in order of decreasing similarity with the variant text prompts from left to right. Comparing first set of retrieved images 715 and second set of retrieved images 720, the same top-matching three images are retrieved by the media processing apparatus in the same order, because the text embeddings for first variant text prompt 705 and second variant text prompt 710 are close together in a multi-modal embedding space and therefore match with the same image embeddings. Furthermore, both first set of retrieved images 715 and second set of retrieved images 720 include gold image 735 (e.g., an expected top result) as the top result.

By contrast, first comparative set of retrieved images 725 and second comparative set of retrieved images 730 are ordered sets of images retrieved by a conventional media processing apparatus based on text embeddings generated by a conventional multi-modal encoder for first variant text prompt 705 and second variant text prompt 710, respectively. First comparative set of retrieved images 725 and second comparative set of retrieved images 730 include some different images from each other and from first set of retrieved images 715 and second set of retrieved images 720, and other same images in a different order, and only first comparative set of retrieved images 725 includes gold image 735. Accordingly, the media processing system retrieves images more accurately and consistently than the conventional media processing system.

Accordingly, a method for media processing is described. One or more aspects of the method include obtaining a text prompt describing content; generating, using a multi-modal encoder, a text embedding based on the text prompt, wherein the multi-modal encoder is trained to encode image descriptions based on a similarity between a caption of a training image and a paraphrase of the caption; and obtaining an image depicting the content based on the text embedding.

Some examples of the method further include identifying an image embedding of the image. Some examples further include retrieving the image from a database based on a comparison of the text embedding and the image embedding. In some aspects, the text embedding and the image embedding comprise vectors in a multi-modal embedding space. Some examples of the method further include tokenizing the text prompt to obtain a sequence of tokens representing the content, wherein the text embedding is generated based on the sequence of tokens.

Some examples of the method further include retrieving a plurality of images from a database based on the text embedding. Some examples of the method further include generating the image using an image generation model conditioned on the text embedding.

Training

Figure 8:
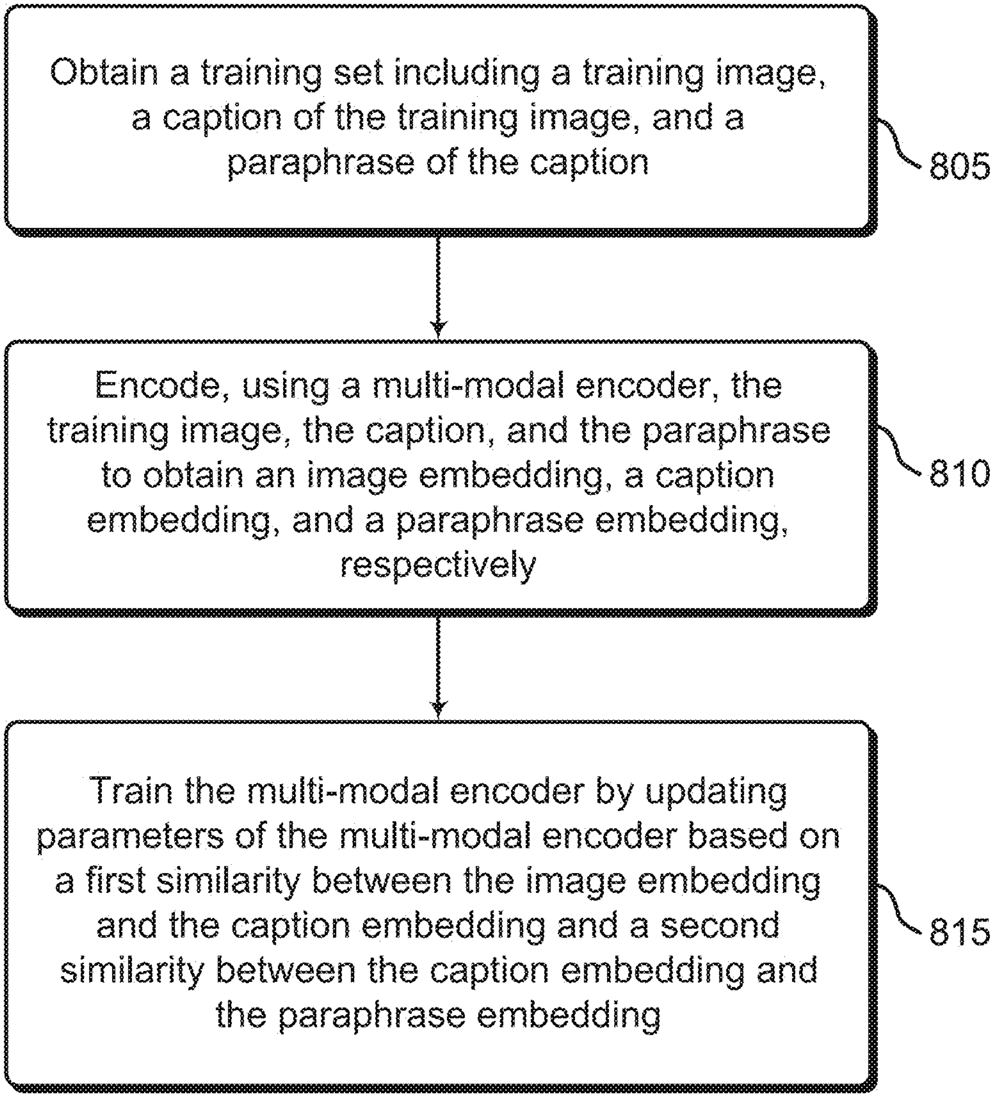
FIG. 8 shows an example of a method for training a machine learning model according to aspects of the present disclosure.

A method for training a machine learning model is described with reference to FIGS. 8-12. FIG. 8 shows an example of a method 800 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, a multi-modal encoder (such as the multi-modal encoder 1415 described with reference to FIG. 14) is trained based on a first similarity between a training image and a caption of the training image and a second similarity between the caption and a paraphrase of the caption.

As used herein, a "caption" refers to a text description of content of the training image. As used herein, "content" refers to any visual characteristic of the image, such as an object depicted in the image, a style for the image, etc. In some embodiments, a "paraphrase of the caption" refers to a text description of the content described by the caption using different language, phrasing, and/or syntax than the caption.

Conventional multi-modal encoders may be trained based on a similarity between an image and a caption of the image or a similarity between the image and a rewritten caption (i.e., an image-to-text comparison). Conventional multi-modal encoders are unable to comprehend some linguistic variations among text prompts, and therefore generate text embeddings that are relatively far apart in the multi-modal embedding space for text prompts that describe same content using different phrasings from each other. Consequently, a conventional media processing system employing a conventional multi-modal encoder is unable to consistently retrieve a same image for different text prompts having similar meanings due to the far-apart text embeddings generated by the conventional multi-modal encoder, as the far-apart text embeddings may most closely match with different image embeddings of different images in the multi-modal embedding space.

By contrast, because the multi-modal encoder is trained based on the second similarity between the caption and the paraphrase (e.g., a text-to-text comparison), the multi-modal encoder better understands diverse synonyms and paraphrases in practical scenarios than conventional multi-modal encoders, and is therefore able to generate text embeddings that are closer to each other in the multi-modal embedding space for text prompts that describe same content using different phrasings from each other. Accordingly, the media processing apparatus is able to retrieve, based on the closely spaced text embeddings, a same image for different text prompts having similar meanings, as the closely spaced text embeddings will both most closely match with a same image embedding of the image in the multi-modal embedding space.

Furthermore, according to some aspects, the multi-modal encoder is trained based on a third similarity between the paraphrase and a paraphrase of the paraphrase. In some embodiments, a "paraphrase of the paraphrase" refers to a text description of the content described by the caption and the paraphrase of the caption using different language, phrasing, and/or syntax than the caption and the paraphrase of the caption. Training the multi-modal encoder based on the third similarity may further reduce a distance between text embeddings generated based on similar text prompts and therefore further increase an image retrieval accuracy of the media processing system.

At operation 805, the system obtains a training set including a training image, a caption of the training image, and a paraphrase of the caption. In some cases, the operations of this step refer to, or may be performed by, a training component as described with reference to FIGS. 9-11, and 14. In an example, the training component retrieves the training set from a database (e.g., the database 130 described with reference to FIG. 1).

In some embodiments, the media processing apparatus generates the caption based on the training image using an image captioning model. An image captioning model is a machine learning model trained to generate a text output describing an input image. An example image captioning model comprises a transformer as described with reference to FIG. 5. In some embodiments, the image captioning model comprises image captioning parameters stored in a memory unit of the media processing apparatus (e.g., the memory unit 1410 described with reference to FIG. 14). In some embodiments, the image captioning model stores the caption of the training image in the database.

In some embodiments, the media processing apparatus generates the paraphrase of the caption using a language generation model as described with reference to FIG. 11.

At operation 810, the system encodes, using a multi-modal encoder, the training image, the caption, and the paraphrase to obtain an image embedding, a caption embedding, and a paraphrase embedding, respectively. In some cases, the operations of this step refer to, or may be performed by, a multi-modal encoder as described with reference to FIGS. 3, 4, 9, 10, and 14. In an example, the multi-modal encoder obtains the image embedding, the caption embedding, and the paraphrase embedding as described with reference to FIG. 10.

At operation 815, the system trains the multi-modal encoder by updating parameters of the multi-modal encoder based on a first similarity between the image embedding and the caption embedding and a second similarity between the caption embedding and the paraphrase embedding. In some cases, the operations of this step refer to, or may be performed by, a training component as described with reference to FIGS. 9-11, and 14. In an example, the training component updates parameters of the multi-modal encoder based on loss functions corresponding to the first similarity and the second similarity as described with reference to FIG. 9.

Figure 9:
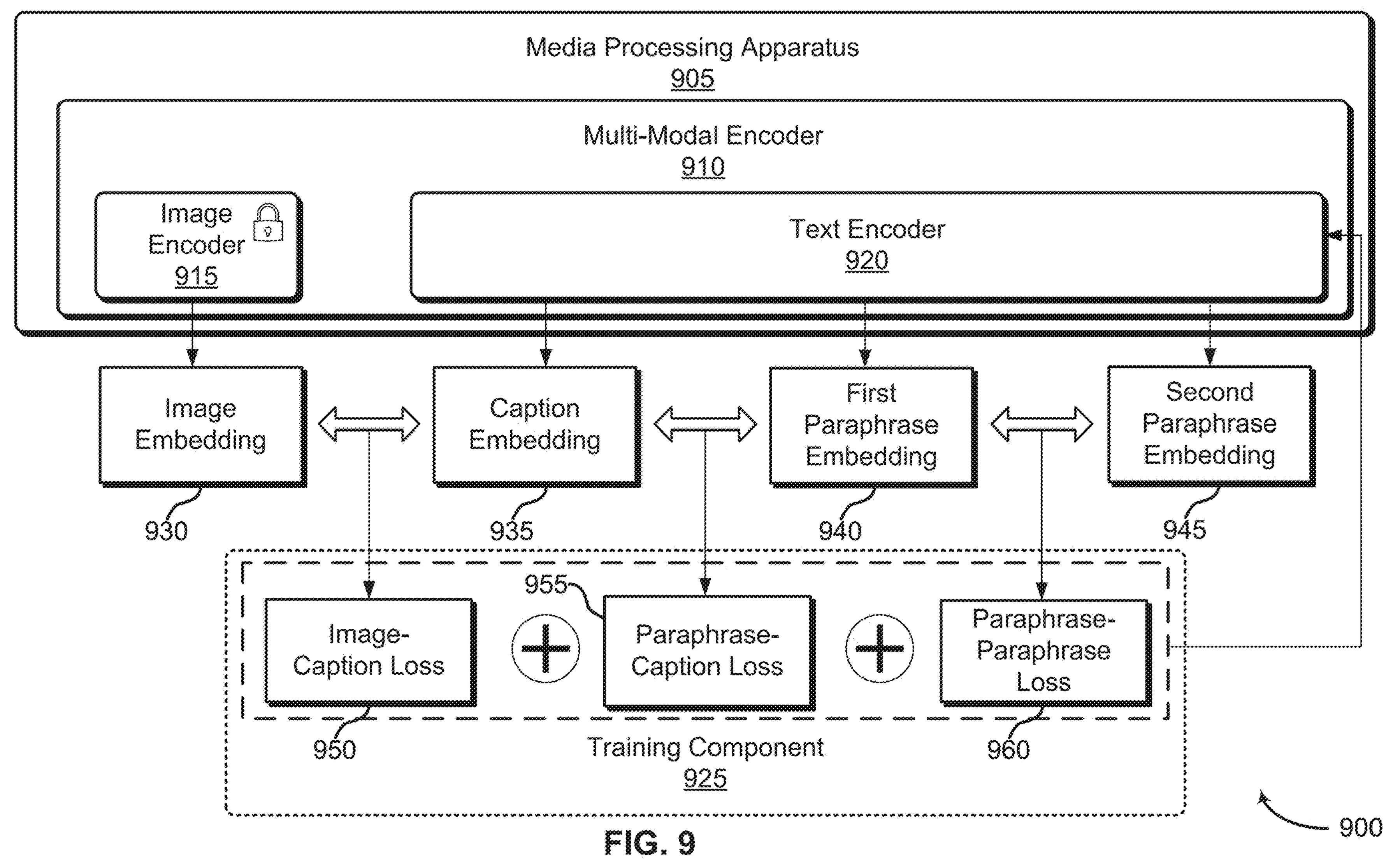
FIG. 9 shows an example of a media processing system for training a multi-modal encoder according to aspects of the present disclosure.

FIG. 9 shows an example of a media processing system for training a multi-modal encoder according to aspects of the present disclosure. The example shown includes media processing system 900, image embedding 930, caption embedding 935, first paraphrase embedding 940, second paraphrase embedding 945, image-caption loss 950, paraphrase-caption loss 955, and paraphrase-paraphrase loss 960.

Media processing system 900 is an example of, or includes aspects of, the corresponding element described with reference to FIGS. 1, 3, 4, 10, and 11. In one aspect, media processing system 900 includes media processing apparatus 905. Media processing apparatus 905 is an example of, or includes aspects of, the corresponding element described with reference to FIGS. 1, 3, 4, 10, 11, and 14. In one aspect, media processing apparatus 905 includes multi-modal encoder 910 and training component 925. Multi-modal encoder 910 is an example of, or includes aspects of, the corresponding element described with reference to FIGS. 3, 4, 10, and 14. Training component 925 is an example of, or includes aspects of, the corresponding element described with reference to FIGS. 10, 11, and 14.

In one aspect, multi-modal encoder 910 includes image encoder 915 and text encoder 920. Image encoder 915 is an example of, or includes aspects of, the corresponding element described with reference to FIG. 10. Text encoder 920 is an example of, or includes aspects of, the corresponding element described with reference to FIGS. 3 and 10.

Referring to FIG. 9, according to some aspects, training component 925 updates parameters of multi-modal encoder 910 based on one or more loss functions computed based on similarities between respective embeddings of a training image, a caption of the training image, a paraphrase of the caption, and a paraphrase of the paraphrase (and therefore, similarities between the training image, caption of the training image, paraphrase of the caption, and paraphrase of the paraphrase).

The term "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration. According to some aspects, the loss function measures a similarity between the training output and the training replacement phrase. A loss function and a process for updating parameters of a machine learning model based on a loss function is described in further detail with reference to FIG. 12.

In some embodiments, training component 925 updates parameters of text encoder 920 based on the one or more loss functions. In some embodiments, training component 925 freezes image encoder 915 (e.g., does not update image encoder 915) while updating the parameters of text encoder 920, thereby increasing an efficiency of the training process. The closed-lock symbol of FIG. 9 indicates that image encoder 915 may be frozen during training. In some embodiments, multi-modal encoder 910 comprises a pre-trained multi-modal encoder, and training component 925 fine-tunes the parameters of text encoder 920 based on the one or more loss functions.

In the example of FIG. 9, image encoder 915 provides an image embedding $X_I$ (e.g., image embedding 930) to training component 925. Image encoder 915 is a machine learning model that is trained to generate an embedding of an image in the multi-modal embedding space shared by text embeddings generated by text encoder 920.

According to some aspects, image encoder 915 comprises a convolutional neural network (CNN). A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. The convolutional layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, image encoder 915 comprises a transformer encoder (such as the encoder 505 described with reference to FIG. 5) configured to generate an embedding in a multi-modal embedding space based on a vector representation of patches of the image.

According to some aspects, image encoder 915 comprises image encoding parameters stored in a memory unit of the media processing apparatus (such as the memory unit 1410 described with reference to FIG. 14).

In the example of FIG. 9, text encoder 920 provides a caption embedding $X_T$ (e.g., caption embedding 935), first paraphrase embedding $X_T'$ (e.g., paraphrase embedding 940), and a second paraphrase embedding $X_T''$ (e.g., second paraphrase embedding 945) to training component 925. In some embodiments, multi-modal encoder 910 generates the image embedding $X_I$, the caption embedding $X_T$, the first paraphrase embedding $X_T'$, and the second paraphrase embedding X-based on a training image, a caption of the training image, a paraphrase of the caption, and a paraphrase of the paraphrase, respectively, as described with reference to FIG. 10. Image embedding 930, caption embedding 935, first paraphrase embedding 940, and second paraphrase embedding 945 are examples of, or include aspects of, the corresponding elements described with reference to FIG. 10.

In some embodiments, training component 925 computes an image-caption loss $\mathcal{L}_{1\,1}(X_I, X_T)$ (e.g., image-caption loss 950) based on a first similarity between the image embedding $X_I$ and the caption embedding $X_T$, and updates the parameters of text encoder 920 based on the image-caption loss $\mathcal{L}_{1\,1}(X_I, X_T)$. The image-caption loss $\mathcal{L}_{1\,1}(X_I, X_T)$ may be an InfoNCE loss function that operates between image embeddings and text embeddings and may minimize the pre-trained multi-modal encoder's forgetting of representations and knowledge acquired during pre-training. NCE stands for Noise-Contrastive Estimation, and InfoNCE is a type of contrastive loss function used for self-supervised learning. In some embodiments, the image-caption loss $\mathcal{L}_{1\,1}(X_I, X_T)$ is implemented based on pairwise cosine similarity between pairs of image embeddings and caption embeddings.

In some embodiments, training component 925 computes a paraphrase-caption loss $\mathcal{L}_{2\,2}(X_T, X_T')$ (e.g., paraphrase-caption loss 955) based on a second similarity between the caption embedding $X_T$ and the first paraphrase embedding first paraphrase embedding $X_T'$, and updates the parameters of text encoder 920 based on the paraphrase-caption loss $\mathcal{L}_{2\,2}(X_T, X_T')$. In some embodiments, the paraphrase-caption loss $\mathcal{L}_{2\,2}(X_T, X_T')$ accounts for a relationship between captions and their corresponding paraphrases and serves to establish a connection within a vector space (e.g., the multi-modal embedding space) between a representation of noisy captions and plain text commonly used in everyday language. The paraphrase-caption loss $\mathcal{L}_2(X_T, X_T')$ may be calculated using a cosine distance function and InfoNCE loss.

In some embodiments, training component 925 computes a paraphrase-paraphrase loss $\mathcal{L}_3(X_T', X_4'')$ (e.g., paraphrase-paraphrase loss 960) based on a third similarity between the first paraphrase embedding $X_T'$ and the second paraphrase embedding $X_T''$, and updates the parameters of text encoder 920 based on the paraphrase-paraphrase loss $\mathcal{L}_3(X_T', X_T'')$. In some embodiments, the paraphrase-paraphrase loss $\mathcal{L}_3(X_T', X_T'')$ serves to bring together various semantically similar plain texts within the vector space. The paraphrase-paraphrase loss $\mathcal{L}_3(X_T, X_T'')$ may be calculated using a cosine distance function and InfoNCE loss.

According to some aspects, training component 925 determines a total loss $\mathcal{L}_{total}$ by adding each of the image-caption loss $\mathcal{L}_1(X_I, X_T)$, the paraphrase-caption loss $\mathcal{L}_2(X_T, X_T')$, and the paraphrase-paraphrase loss $\mathcal{L}_3(X_T, X_T'')$ $\mathcal{L}_{total}:=\mathcal{L}_1(X_I, X_T)+\mathcal{L}_2(X_I, X_T')+\mathcal{L}_3(X_T', X_T'')$. In some embodiments, training component 925 updates the parameters of text encoder 920 based on the total loss $\mathcal{L}_{total}$.

In some embodiments, training component 925 computes an image-paraphrase loss $\mathcal{L}_4(X_I, X_T')$ based on a fourth similarity between the image embedding $X_I$ and the first paraphrase embedding $X_T'$, and updates the parameters of text encoder 920 based on the image-paraphrase loss $\mathcal{L}_4(X_I, X_T')$.

Figure 10:
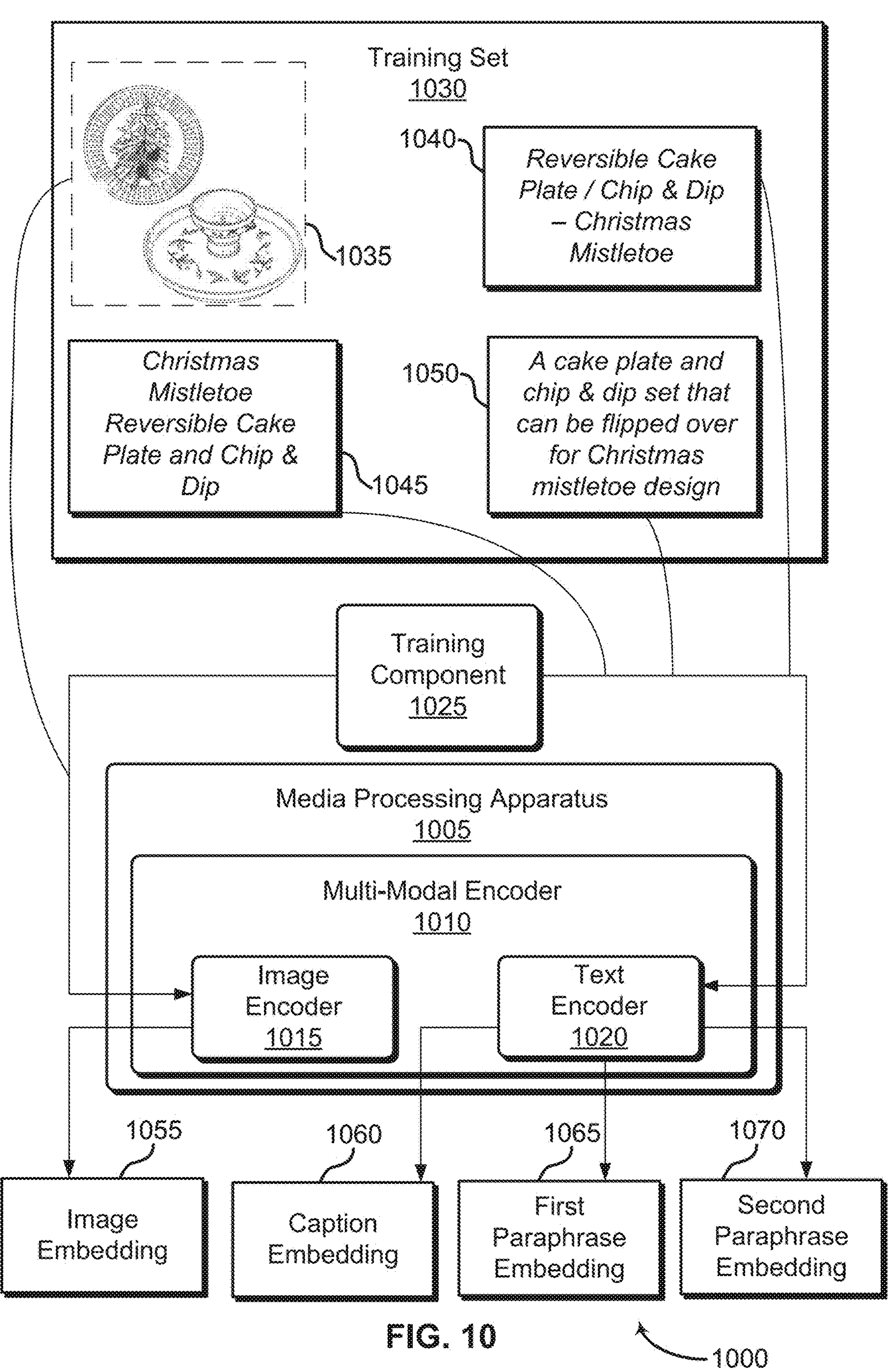
FIG. 10 shows an example of a media processing system for generating training embeddings using a multi-modal encoder according to aspects of the present disclosure.

FIG. 10 shows an example of a media processing system for generating training embeddings using a multi-modal encoder according to aspects of the present disclosure. The example shown includes media processing system 1000, training set 1030, image embedding 1055, caption embedding 1060, first paraphrase embedding 1065, and second paraphrase embedding 1070.

Media processing system 1000 is an example of, or includes aspects of, the corresponding element described with reference to FIGS. 1, 3, 4, 9, and 11. In one aspect, media processing system 1000 includes media processing apparatus 1005. Media processing apparatus 1005 is an example of, or includes aspects of, the corresponding element described with reference to FIGS. 1, 3, 4, 9, 11, and 14. In one aspect, media processing apparatus 1005 includes multi-modal encoder 1010 and training component 1025. Multi-modal encoder 1010 is an example of, or includes aspects of, the corresponding element described with reference to FIGS. 3, 4, 9, and 14. Training component 1025 is an example of, or includes aspects of, the corresponding element described with reference to FIGS. 9, 11, and 14.

In one aspect, multi-modal encoder 1010 includes image encoder 1015 and text encoder 1020. Image encoder 1015 is an example of, or includes aspects of, the corresponding element described with reference to FIG. 9. Text encoder 1020 is an example of, or includes aspects of, the corresponding element described with reference to FIGS. 3 and 9.

According to some aspects, a training set (e.g., training set 1030) includes an image (e.g., image 1035), a caption describing content of the image (e.g., caption 1040), a paraphrase of the caption (e.g., first paraphrase 1045), and a paraphrase of the paraphrase (e.g., second paraphrase 1050). In the example of FIG. 10, caption 1040 describes content of image 1035 as "Reversible Cake Plate/Chip & Dip-Christmas Mistletoe", first paraphrase 1045 describes the content as "Christmas Mistletoe Reversible Cake Plate and Chip & Dip", and second paraphrase 1050 describes the content as "A cake plate and chip & dip set that can be flipped over for Christmas mistletoe design". Caption 1040, first paraphrase 1045, and second paraphrase 1050 are examples of, or include aspects of, the corresponding elements described with reference to FIG. 11.

Training component 1025 provides the training set to multi-modal encoder 1010. Image encoder 1015 generates an image embedding (e.g., image embedding 1055) based on the image. Text encoder 1020 generates a caption embedding (e.g., caption embedding 1060) based on the caption, a first paraphrase embedding (e.g., first paraphrase embedding 1065) based on the paraphrase of the caption, and a second paraphrase embedding (e.g., second paraphrase embedding 1070) based on the paraphrase of the paraphrase. Each of the image embedding, the caption embedding, the first paraphrase embedding, and the second paraphrase embedding are obtained in a same multi-modal embedding space. Image embedding 1055, caption embedding 1060, first paraphrase embedding 1065, and second paraphrase embedding 1070 are examples of, or include aspects of, the corresponding elements described with reference to FIG. 9.

Figure 11:
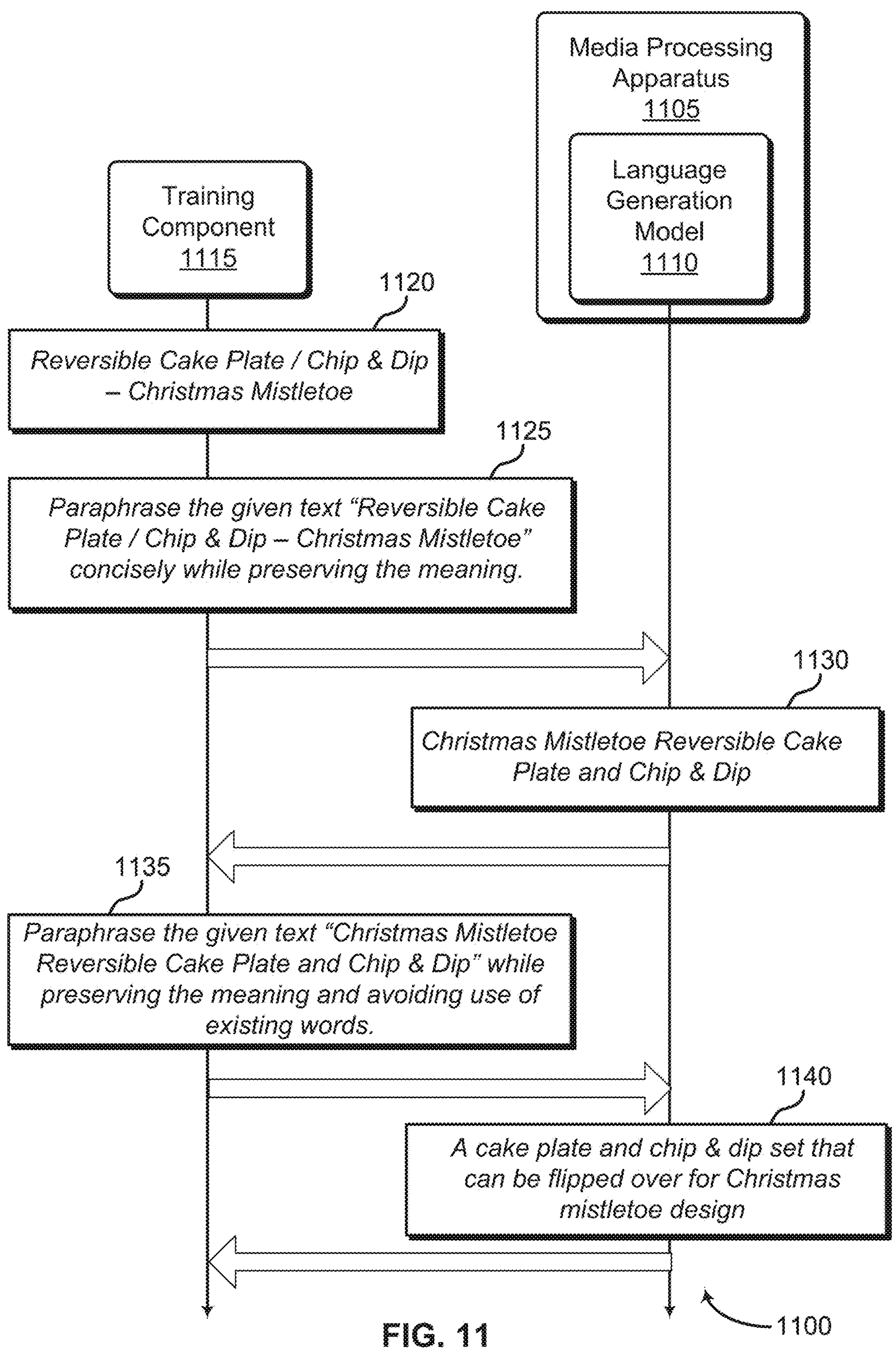
FIG. 11 shows an example of a media processing system for generating one or more caption paraphrases according to aspects of the present disclosure.

FIG. 11 shows an example of a media processing system 1100 for generating one or more caption paraphrases according to aspects of the present disclosure. The example shown includes media processing system 1100, caption 1120, first prompt 1125, first paraphrase 1130, second prompt 1135, and second paraphrase 1140.

Media processing system 1100 is an example of, or includes aspects of, the corresponding element described with reference to FIGS. 1, 3, 4, 9, and 10. In one aspect, media processing system 1100 includes media processing apparatus 1105. Media processing apparatus 1105 is an example of, or includes aspects of, the corresponding element described with reference to FIGS. 1, 3, 4, 9, 10, and 14. In one aspect, media processing apparatus 1105 includes language generation model 1110 and training component 1115. Training component 1115 is an example of, or includes aspects of, the corresponding element described with reference to FIGS. 9, 10, and 14.

According to some aspects, training component 1115 generates a prompt requesting a variant of a caption using different language. In an example, training component 1115 retrieves the caption (e.g., caption 1120) from the database and generates the prompt (e.g., prompt 1125) by inserting the caption into a template. Training component 1115 provides the prompt to language generation model 1110.

Language generation model 1110 comprises a machine learning model trained to generate a text output based on a text input. In an example, language generation model 1110 comprises a large language model comprising one or more transformers (such as the transformer 500 described with reference to FIG. 5). A large language model is a machine learning model that is trained on a sufficiently large dataset to be able to recognize and interpret human language or other types of complex data. In some embodiments, language generation model 1110 comprises text generation parameters stored in a memory unit of the media processing apparatus (such as the memory unit 1410 described with reference to FIG. 14).

Language generation model 1110 generates the variant of the caption, or the paraphrase of the caption (e.g., first paraphrase 1130) based on the prompt. A conventional image-captioning dataset typically comprises a collection of image-caption pairs. Image captions available on the Internet often contain considerable noise, such as superfluous punctuation, product codes, and file extensions, which differ from typical queries. By contrast, the media processing apparatus directly paraphrases an original caption using language generation model 1110, in some cases converting a noisy caption into a more straightforward text format commonly used in everyday language.

In some embodiments, training component 1115 receives the paraphrase of the caption and generates an additional prompt requesting a variant of the variant of the caption (e.g., second prompt 1135) by inserting the paraphrase of the caption into an additional template. Language generation model 1110 generates an additional paraphrase (e.g., second paraphrase 1140) based on the additional prompt. The additional template may include language (such as "avoiding the use of existing words") that encourages morphological diversity of the additional paraphrase. Caption 1120, first paraphrase 1130, and second paraphrase 1140 are examples of, or include aspects of, the corresponding elements described with reference to FIG. 10.

Figure 12:
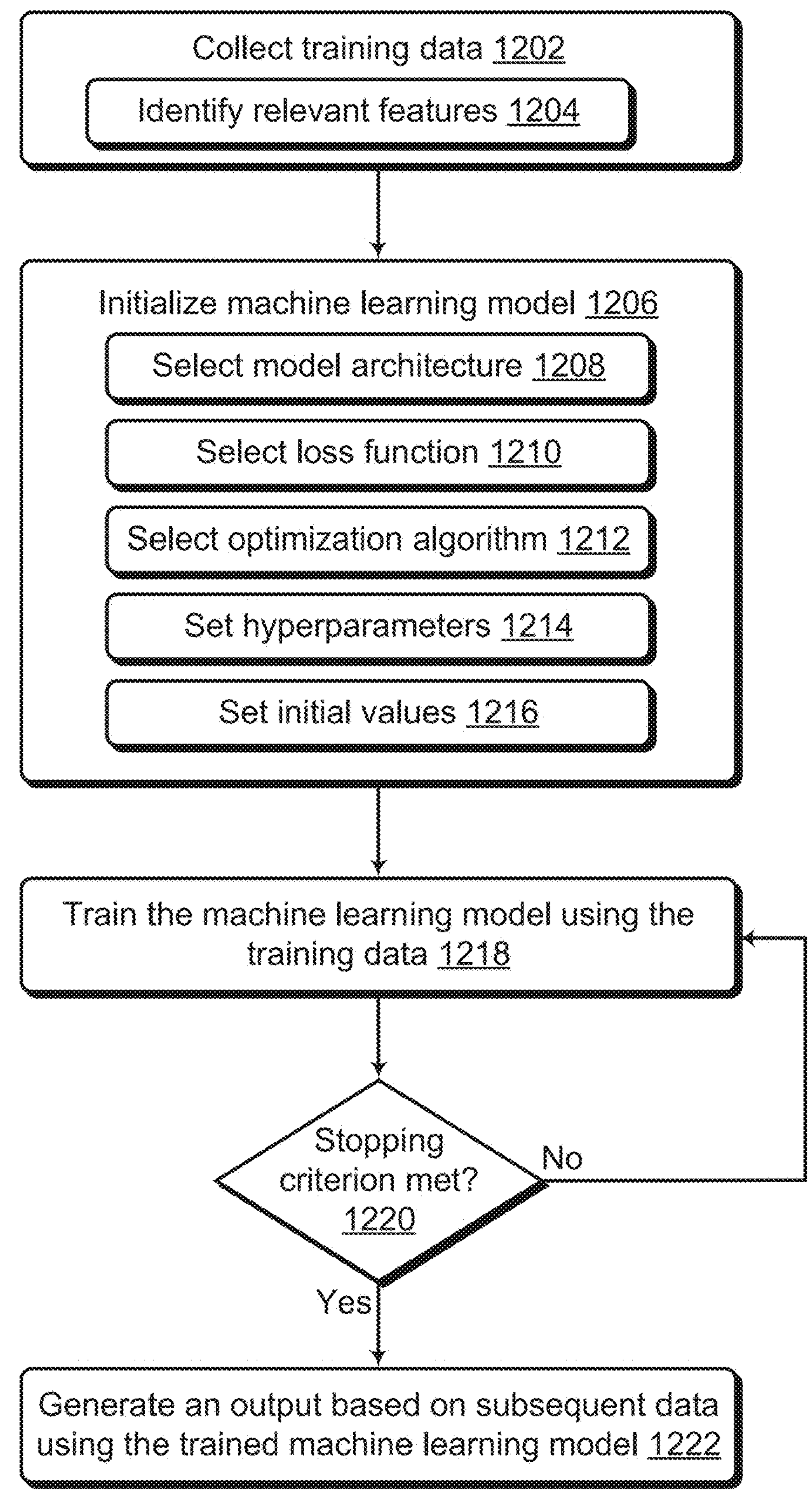
FIG. 12 shows an example of a flow diagram depicting an algorithm as a step-by-step procedure for training a machine learning model according to aspects of the present disclosure.

FIG. 12 shows an example of a flow diagram depicting an algorithm as a step-by-step procedure 1200 for training a machine learning model according to aspects of the present disclosure. In some embodiments, the procedure 1200 describes an operation of the training component 1425 described for configuring the machine learning model (e.g., multi-modal encoder 1415) as described with reference to FIG. 14. The procedure 1200 provides one or more examples of generating training data, use of the training data to train a machine-learning model, and use of the trained machine-learning model to perform a task.

To begin in this example, a machine-learning system collects training data (block 1202) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 1204) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1206). Initialization of the machine-learning model includes selecting a model architecture (block 1208) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 1210). The loss function is utilized to measure a difference between an output of the machine-learning model (i.e., predictions) and target values (e.g., as expressed by the training data) to be used to train the machine-learning model. Additionally, an optimization algorithm is selected (1212) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1214), examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1218) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 1220), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1220), the procedure 1200 continues training of the machine-learning model using the training data (block 1218) in this example.

If the stopping criterion is met ("yes" from decision block 1220), the trained machine-learning model is then utilized to generate an output based on subsequent data (block 1222). The trained machine-learning model, for instance, is trained to perform a task as described above and therefore once trained is configured to perform that task based on subsequent data received as an input and processed by the machine-learning model.

Accordingly, a method for training a machine learning model is described. One or more aspects of the method include obtaining a training set comprising a training image, a caption of the training image, and a paraphrase of the caption; encoding, using a multi-modal encoder, the training image, the caption, and the paraphrase to obtain an image embedding, a caption embedding, and a paraphrase embedding, respectively; and training the multi-modal encoder by updating parameters of the multi-modal encoder based on a first similarity between the image embedding and the caption embedding and a second similarity between the caption embedding and the paraphrase embedding.

Some examples of the method further include computing an image-caption loss based on the first similarity, wherein the parameters of the multi-modal encoder are updated based on the image-caption loss. Some examples of the method further include computing a paraphrase-caption loss based on the second similarity, wherein the parameters of the multi-modal encoder are updated based on the paraphrase-caption loss. Some examples of the method further include computing a paraphrase-paraphrase loss based on a third similarity between the paraphrase embedding and an additional paraphrase embedding of an additional paraphrase of the paraphrase, wherein the parameters of the multi-modal encoder are updated based on the paraphrase-paraphrase loss.

Some examples of the method further include generating the caption based on the training image. Some examples of the method further include generating the paraphrase based on the caption. Some examples of the method further include generating a prompt requesting a variant of the caption using different language. Some examples further include providing the prompt to a large language model. Some examples of the method further include generating an additional paraphrase based on the paraphrase.

Some examples of the method further include fine-tuning a pre-trained multi-modal encoder. Some examples of the method further include freezing an image encoder of the multi-modal encoder. Some examples further include updating a text encoder of the multi-modal encoder.

Computing Device

FIG. 13 shows an example of a computing device according to aspects of the present disclosure. The computing device 1300 may be an example of the media processing apparatus 1400 described with reference to FIG. 14. In one aspect, computing device 1300 includes processor(s) 1305, memory subsystem 1310, communication interface 1315, I/O interface 1320, user interface component(s) 1325, and channel 1330. In some embodiments, computing device 1300 includes one or more processors 1305 that can execute instructions stored in memory subsystem 1310 to perform media generation.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote-control device interfaced with a user interface directly or through the I/O controller), or a combination thereof. In some cases, user interface component(s) 1325 include a GUI.

Figure 14:
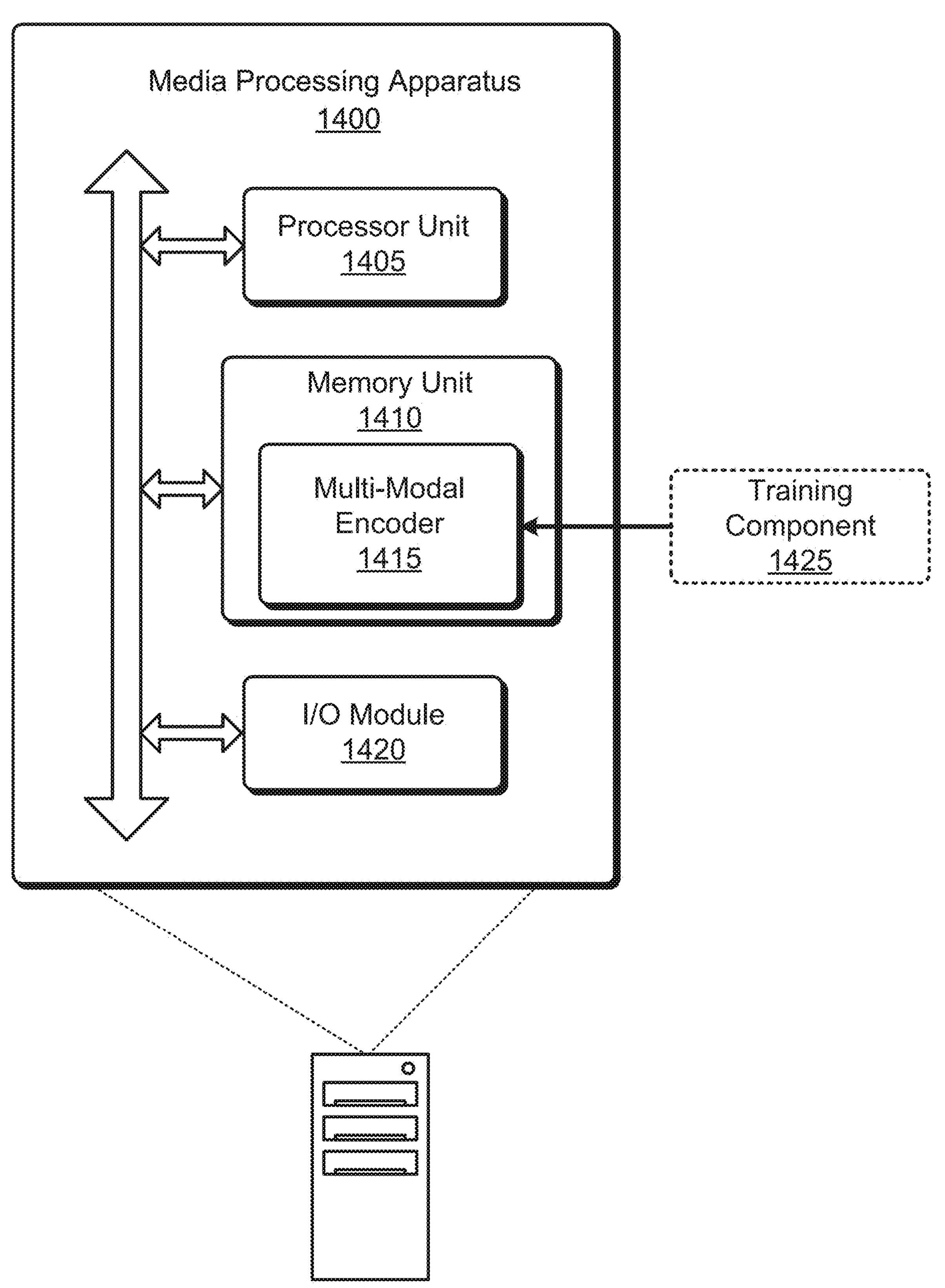
FIG. 14 shows an example of a media processing apparatus according to aspects of the present disclosure.

FIG. 14 shows an example of a media processing apparatus according to aspects of the present disclosure. Media processing apparatus 1400 is an example of, or includes aspects of, the corresponding element described with reference to FIGS. 1, 3, 4, and 9-11. In one aspect, media processing apparatus 1400 includes processor unit 1405, memory unit 1410, I/O module 1420, and training component 1425. Multi-modal encoder 1415 is an example of, or includes aspects of, the corresponding element described with reference to FIGS. 3, 4, 9, and 10. Training component 1425 is an example of, or includes aspects of, the corresponding element described with reference to FIGS. 9-11. In some examples, training component 1425 is located outside the media processing apparatus 1400. Training component 1425 may be implemented in hardware or software and may be executed by a processor, firmware, or any combination thereof.

Processor unit 1405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 1405 is configured to operate a memory array using a memory controller. In other cases, a memory controller is integrated into processor unit 1405. In some cases, processor unit 1405 is configured to execute computer-readable instructions stored in memory unit 1410 to perform various functions. In some aspects, processor unit 1405 includes special purpose components for modem processing, baseband processing, digital signal processing, or transmission processing. According to some aspects, processor unit 1405 comprises one or more processors described with reference to FIG. 13.

Memory unit 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 1405 to perform various functions described herein.

In some cases, memory unit 1410 includes a basic input/output system (BIOS) that controls basic hardware or software operations, such as an interaction with peripheral components or devices. In some cases, memory unit 1410 includes a memory controller that operates memory cells of memory unit 1410. For example, the memory controller may include a row decoder, column decoder, or both. In some cases, memory cells within memory unit 1410 store information in the form of a logical state. According to some aspects, memory unit 1410 is an example of the memory subsystem 1310 described with reference to FIG. 13.

According to some aspects, media processing apparatus 1400 uses one or more processors of processor unit 1405 to execute instructions stored in memory unit 1410 to perform functions described herein. For example, the media processing apparatus 1400 may obtain a text prompt describing content; generate, using a multi-modal encoder, a text embedding based on the text prompt, wherein the multi-modal encoder is trained to encode image descriptions based on a similarity between a caption of a training image and a paraphrase of the caption; and obtain an image depicting the content based on the text embedding.

Memory unit 1410 may include a multi-modal encoder 1415 trained to encode image descriptions based on a similarity between a caption of a training image and a paraphrase of the caption. For example, after training, multi-modal encoder 1415 may perform inferencing operations as described with reference to FIGS. 6-7 to generate a text embedding based on a text prompt. Multi-modal encoder 1415 is an example of, or includes aspects of, the corresponding element described with reference to FIGS. 3-4 and 9-10.

In some embodiments, multi-modal encoder 1415 is an artificial neural network (ANN), such as the transformer described with reference to FIG. 5. An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of multi-modal encoder 1415 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 1425 may train multi-modal encoder 1415. For example, parameters of multi-modal encoder 1415 can be learned or estimated from training data and then used to make predictions or perform tasks based on learned patterns and relationships in the data. In some examples, the parameters are adjusted during the training process to minimize a loss function or maximize a performance metric (e.g., as described with reference to FIGS. 8-12). The goal of the training process may be to find optimal values for the parameters that allow multi-modal encoder 1415 to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, multi-modal encoder 1415 can be used to make predictions on new, unseen data (i.e., during inference).

I/O module 1420 receives inputs from and transmits outputs of the media processing apparatus 1400 to other devices or users. For example, I/O module 1420 receives inputs for the machine learning model 1415 and transmits outputs of the machine learning model 1415. According to some aspects, I/O module 1420 is an example of the I/O interface 1320 described with reference to FIG. 13.

Accordingly, a system and apparatus for media processing is described. One or more aspects of the system and apparatus include at least one processor; at least one memory storing instructions executable by the at least one processor; and a multi-modal encoder comprising encoding parameters stored in the at least one memory, the multi-modal encoder configured to generate a text embedding based on a text prompt, wherein the multi-modal encoder is trained to encode image descriptions based on a similarity between a caption of a training image and a paraphrase of the caption.

Some examples of the system and apparatus further include a language generation model comprising text generation parameters stored in the at least one memory, the language model trained to generate the paraphrase. Some examples of the system and apparatus further include a database storing an image embedding. Some examples further include a retrieval component configured to retrieve an image from the database based on the text embedding and the image embedding. Some examples of the system and apparatus further include an image generation model comprising image generation parameters stored in the at least one memory, the image generation model trained to generate an image based on the text embedding.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for media processing, comprising:

obtaining a text prompt describing content;

generating, using a text encoder of a multi-modal encoder, a text embedding in a multi-modal embedding space based on the text prompt, wherein the text encoder is trained to encode image descriptions in the multi-modal embedding space by computing a paraphrase-caption loss based on a similarity between a caption of a training image and a paraphrase of the caption and updating parameters of the text encoder based on the paraphrase-caption loss, wherein the caption comprises a first text string describing the training image and the paraphrase comprises a second text string describing the training image, and wherein the first text string is different from the second text string; and obtaining an image depicting the content based on the text embedding.

2. The method of claim 1, wherein obtaining the image comprises:

identifying an image embedding of the image; and retrieving the image from a database based on a comparison of the text embedding and the image embedding.

3. The method of claim 2, wherein:

the text embedding and the image embedding comprise vectors in the multi-modal embedding space.

4. The method of claim 1, further comprising:

retrieving a plurality of images from a database based on the text embedding.

5. The method of claim 1, wherein obtaining the image comprises:

generating the image using an image generation model conditioned on the text embedding.

6. The method of claim 1, further comprising:

tokenizing the text prompt to obtain a sequence of tokens representing the content, wherein the text embedding is generated based on the sequence of tokens.

7. A method for training a machine learning model, comprising:

obtaining a training set comprising a training image, a caption of the training image, and a paraphrase of the caption, wherein the caption comprises a first text string describing the training image and the paraphrase comprises a second text string describing the training image, and wherein the first text string is different from the second text string;

encoding, using an image encoder of a multi-modal encoder, the training image to obtain an image embedding in a multi-modal embedding space;

encoding, using a text encoder of the multi-modal encoder, the caption and the paraphrase to obtain a caption embedding and a paraphrase embedding, respectively, in the multi-modal embedding space; and training the text encoder of the multi-modal encoder by computing an image-caption loss based on a first similarity between the image embedding and the caption embedding, computing a paraphrase-caption loss based on a second similarity between the caption embedding and the paraphrase embedding, and updating parameters of the text encoder based on the image-caption loss and the paraphrase-caption loss.

8. The method of claim 7, wherein training the text encoder comprises:

computing a paraphrase-paraphrase loss based on a third similarity between the paraphrase embedding and an additional paraphrase embedding of an additional paraphrase of the paraphrase and updating the parameters of the text encoder based on the paraphrase-paraphrase loss.

9. The method of claim 7, wherein obtaining the training set comprises:

generating the caption based on the training image.

10. The method of claim 7, wherein obtaining the training set comprises:

generating the paraphrase based on the caption.

11. The method of claim 10, wherein generating the paraphrase comprises:

generating a prompt requesting a variant of the caption using different language; and providing the prompt to a large language model.

12. The method of claim 7, wherein obtaining the training set comprises:

generating an additional paraphrase based on the paraphrase.

13. The method of claim 7, wherein training the text encoder comprises:

fine-tuning a pre-trained multi-modal encoder.

14. The method of claim 7, wherein training the text encoder comprises:

freezing the image encoder.

15. A system for media processing, comprising:

at least one processor;

at least one memory storing instructions executable by the at least one processor; and a multi-modal encoder comprising a text encoder comprising encoding parameters stored in the at least one memory, the text encoder configured to generate a text embedding in a multi-modal embedding space based on a text prompt, wherein the text encoder is trained to encode image descriptions in the multi-modal embedding space by computing a paraphrase-caption loss based on a similarity between a caption of a training image and a paraphrase of the caption and updating parameters of the text encoder based on the paraphrase-caption loss, wherein the caption comprises a first text string describing the training image and the paraphrase comprises a second text string describing the training image, and wherein the first text string is different from the second text string.

16. The system of claim 15, the system further comprising:

a language generation model comprising text generation parameters stored in the at least one memory, the language generation model trained to generate the paraphrase.

17. The system of claim 15, the system further comprising:

a database storing an image embedding; and a retrieval component configured to retrieve an image from the database based on the text embedding and the image embedding.

18. The system of claim 15, the system further comprising:

an image generation model comprising image generation parameters stored in the at least one memory, the image generation model trained to generate an image based on the text embedding.

* * * * *